US010722878B1

(12) United States Patent
Kolomitsyn et al.

(10) Patent No.: US 10,722,878 B1
(45) Date of Patent: Jul. 28, 2020

(54) WEAK ION EXCHANGE PARTICULATE MEDIUM PREPARED FROM PHENOL-CONTAINING ORGANIC MATTER FOR ANIONS CONTAINED IN AQUEOUS SOLUTIONS

(71) Applicants: American Peat Technology, LLC, Aitkin, MN (US); Regents of the University of Minnesota, Minneapolis, MN (US)

(72) Inventors: Igor V. Kolomitsyn, Duluth, MN (US); Douglas A. Green, Crosby, MN (US); Liudmyla Kildyshova, Duluth, MN (US)

(73) Assignees: American Peat Technology, LLC, Aitkin, MN (US); Regents of the University of Minnesota, Minneapolis, MN (US)

( * ) Notice: Subject to any disclaimer, the term of this patent is extended or adjusted under 35 U.S.C. 154(b) by 10 days.

(21) Appl. No.: 15/611,175

(22) Filed: Jun. 1, 2017

(51) Int. Cl.
*B01J 41/09* (2017.01)
*B01J 2/20* (2006.01)
(Continued)

(52) U.S. Cl.
CPC .............. *B01J 41/09* (2017.01); *B01J 2/20* (2013.01); *C02F 1/42* (2013.01); *C10B 53/02* (2013.01);
(Continued)

(58) Field of Classification Search
CPC ....................................................... B01J 41/09
See application file for complete search history.

(56) References Cited

U.S. PATENT DOCUMENTS 3,307,934 A   3/1967  Palmer et al.
4,177,331 A   12/1979 Amick
(Continued)

FOREIGN PATENT DOCUMENTS

RU   2116128   7/1998
RU   2173578   9/2001

OTHER PUBLICATIONS

S.V. Vaidya, S.S. Bapat, A.S. Kale and S.V. Mokashi, "Weak Base Anion Exchange Resin: Simplification of Amination Process and Control on SBC," Ion Exchange Advances—Proceedings of SCI Conference IEX '92 at Churchill College, Cambridge, UK, Jul. 12-17, 1992 (Elsevier Applied Science, 1992).
(Continued)

*Primary Examiner* — Peter F Godenschwager
(74) *Attorney, Agent, or Firm* — DeWitt LLP

(57) ABSTRACT

A process for the preparation of a granulated or pelletized weak anion exchange medium from a phenol-containing organic material like peat, followed by low-temperature torrefaction of the granules to produce a high degree of physical stability of the granules at high-pH conditions, followed by chemical pretreatment of the stable granule via a hydrolysis reaction, and optionally surface treatment with acids, followed by the main chemical treatment of the hydrolyzed granule via separate aldehyde and amine reagents, or alternatively via an adduct reagent like hexamethylenetetramine is provided by this invention. The weak anion exchange medium of this invention can be used in a variety of aqueous solution treatment processes, such as wastewater treatment for removing mineral acids like $H_2SO_4$, $HNO_3$, HCl, HBr, HF, $H_3PO_4$, HI, or formic acid from the wastewater. The resulting anion exchanger medium is particularly useful for treating wastewaters in a low-pH environment.

25 Claims, 4 Drawing Sheets

(51) Int. Cl.
*C02F 1/42* (2006.01)
*C10B 53/02* (2006.01)
*C02F 103/10* (2006.01)

(52) U.S. Cl.
CPC .... *C02F 2001/422* (2013.01); *C02F 2103/10* (2013.01)

(56) References Cited

U.S. PATENT DOCUMENTS

| | | |
|---|---|---|
| 4,200,706 A | 4/1980 | Starks |
| 4,778,602 A | 10/1988 | Allen, III |
| 5,314,638 A | 5/1994 | Morine et al. |
| 5,578,547 A | 11/1996 | Summers, Jr. et al. |
| 5,602,071 A | 2/1997 | Summers, Jr. et al. |
| 5,624,576 A | 4/1997 | Lenhart et al. |
| 5,726,210 A | 3/1998 | Teraue et al. |
| 6,042,743 A | 3/2000 | Clemenson |
| 6,143,692 A | 11/2000 | Sanjay et al. |
| 6,287,496 B1 | 9/2001 | Lownds |
| 6,429,171 B1 | 8/2002 | Clemenson |
| 6,455,149 B1 | 9/2002 | Hagen et al. |
| 6,998,038 B2 | 2/2006 | Howard |
| 8,846,773 B2 | 9/2014 | Fukui et al. |

OTHER PUBLICATIONS

Nikola Blazevic, D. Kolbah, Branka Belin, Vitomir Sunjic and Franjo Kajfez, "Hexamethylenetetramine, A Versatile Reagent in Organic Synthesis," Georg Theime Publishers, (Issue 3, pp. 161-176) (Mar. 1979).

Mortimer Harvey and L.H. Baekeland, "Further Studies of Phenolic Hexamethylenetetramine Compounds," Journal of Industrial & Engineering Chemistry, (vol. 13, No. 2, pp. 135-141) (Feb. 1921).

Y.Ogata, A. Kawasaki and F. Sugiura, "Kinetics and Mechanism of the Duff Reaction," Tetrahedron, (vol. 24, pp. 5001-5010), Pergamon Press, (1968).

I.S. Belostotskaya, N.L. Komissarova, T.I. Prokof'Eva, L.N. Kurkovskaya and V.B. Vol'Eva, "New Opportunities for Duff Reaction," Russian Journal of Organic Chemistry, (vol. 41, No. 1, pp. 703-706) (2005).

Nicolas Grimblat, Ariel M. Sarotti, Teodoro S. Kaufman and Sebastian O. Simonetti, "A Theoretical Study of the Duff Reaction: Insights into its Selectivity," Journal of Organic & Biomolecular Chemistry, (vol. 14, pp. 10496-10501) (2016).

WEAK ION EXCHANGE PARTICULATE MEDIUM PREPARED FROM PHENOL-CONTAINING ORGANIC MATTER FOR ANIONS CONTAINED IN AQUEOUS SOLUTIONS

FIELD OF THE INVENTION

This invention relates generally to particulate anion exchange media prepared from phenol-containing organic matter like peat, and more specifically to granules made from such material that are torrefied and chemically modified to provide them the requisite physical and chemical stability at high pH conditions and anion exchange capacity for removal of anions found in aqueous solutions like wastewater or mine waters at low pH.

BACKGROUND OF THE INVENTION

Our planet's surface area is covered primarily by water. Aquatic water systems like oceans, rivers, bays and estuaries, lakes, and ponds cover over two-thirds of the Earth's surface. Pollutants can contaminate these surface water sources that harm numerous plant and animal species. But, they also frequently seep directly into the ground and pollute the aquifers and other ground water systems below.

Ground water naturally contains metallic and non-metallic ions that slowly dissolve from soil particles, sediments, and rocks as the water travels above and underground. Metallic ions typically appear only in trace amounts in natural groundwater (e.g., less than 1.0 mg/L=1.0 ppm). Major cation constituents like sodium, calcium, and magnesium and major anion constituents like bicarbonate, sulfate, chloride, and silica (e.g., 1.0-1000 mg/L=1-1000 ppm) also naturally appear in such groundwater.

But human activities also impact ground water, introducing pollutants in the process to elevate the natural contamination level of the ground water. Heavy metal cation contaminants like arsenic, lead, mercury, cadmium, iron, aluminum, antimony, chromium, cobalt, copper, manganese, nickel, uranium, vanadium, and zinc become toxic when they are not metabolized by the body, and accumulate in the soft tissues, posing significant health problems. Sulfate anion contaminants constitute another widespread contaminant. Sulfates and sulfuric acid products are commonly used in the manufacture of fertilizers, chemicals, dyes, glass, paper, soaps, textiles, fungicides, insecticides, astringents, and emetics. They are likewise employed by the mining, wood pulp paper, metal, and plating industries, as well as for sewage treatment and leather processing. These sulfate compounds may be discharged into water effluent streams emanating from the industrial plants. The mining industry excavates the earth for coal and precious metals, turning deeply embedded rocks containing sulfur compounds up to the earth's surface with the resulting sulfates winding up within the water runoff that enters nearby rivers and lakes. Such sulfates react with organic carbon and water to produce hydrogen sulfide ($H_2S$) and carbonic acid. The presence of $H_2S$ in drinking water produces a "rotten egg" odor. Indeed, sulfate compounds contained in drinking water can be tasted at concentrations as low as 250 mg/L.

Thus, government regulations often impose discharge limits between 250 mg/L and 2000 mg/L for industrial wastewaters containing high sulfate concentrations. At levels above this 250 mg/L threshold, sulfates can cause diarrhea and resulting dehydration. High sulfate levels in drinking water can also cause fluid and weight loss in animals.

It is therefore necessary for miners and manufacturers to treat these industrial wastewater streams to reduce these heavy sulfate concentrations to acceptable levels before they are introduced into water streams and water bodies that are subject to environmental government laws and regulations. Several technologies are available for removing sulfates from water. The most common method used is a chemical process in which hydrated lime ($Ca(OH)_2$) is added to the wastewater stream to react with sulfate compounds in the water to precipitate calcium sulfate ($CaSO_4$). Such calcium sulfate hydrates to become common mineral gypsum which is used in wall board. But, because calcium sulfate has a solubility of approximately 2000 mg/L as sulfate, this method does not provide effective sulfate reduction below this 2000 mg/L concentration level.

Reverse osmosis represents a mechanical process for removing contaminants from wastewater streams that can produce sulfate levels below 2000 mg/L. High-pressure commercial reverse osmosis units can reduce sulfates contained in wastewaters by 95%. However, this technology requires costly equipment, and produces byproduct streams that must in turn be treated and handled.

A "solution" represents a mixture of two or more individual substances that cannot be separated by a mechanical means, such as filtration. For example, a liquid solution occurs when a liquid, solid, or gas solute is dissolved in a liquid solvent. The liquid solution constitutes an aqueous solution if the solvent is water. Wastewater streams very often constitute aqueous solutions containing one or more contaminants.

Another well-known wastewater treatment method is "adsorption" in which the toxins and contaminants contained in the dissolved, aqueous phase in the wastewater are transferred to the surface of solid sorption media. Such a medium that is high in carbon may be activated whether by chemical, physical, or thermal means to increase the surface area and create porosity for the resulting toxins and contaminants that are sorbed onto active sites on the media surface. However, such sorption media that are particularly useful for removing toxic cations from wastewaters do not constitute ion exchange media.

Ion exchange is a separation process widely used in the food and beverage, hydrometallurgical, metals finishing, chemical and petrochemical, pharmaceutical, sugar and sweeteners, ground and potable water, nuclear, softening and industrial water, semiconductors, power, and many other industries. Aqueous and other ion-containing solutions can be purified, separated, and decontaminated by swapping targeted ions contained in the solution with substitute ions typically provided by ion exchange resins or other substrates.

But ion exchange is also a proven technology for removing dissolved anions or other impurities from these wastewater streams. It represents a reversible process in which the ionized compound or element changes place with another ionized compound or element on the surface of a medium like an ion exchange resin. For example, high levels of sulfates up to 1500 mg/L can also be removed by an ion exchanger sold by Rain Dance Water Systems that uses a specially designed resin to replace the sulfates with harmless chlorine in the water.

"Cost-Effective Sulfate Removal" ("CESR") is another treatment system for removing sulfate that was commercialized by Hydrometrics, Inc. of Helena, Mont. It is a chemical treatment process that treats lime-treated water to precipitate sulfate as a nearly insoluble calcium-alumina-sulfate compound known as "ettringite." But this system also requires costly equipment and produces a substantial amount of byproduct streams that must in turn be treated and handled for proper disposal.

Ion exchange can produce high-purity water (including softening, deionizing, water recycling, and removal of heavy metals) from the wastewater. In a familiar example to many readers, a cation exchange-based water softener works by passing hard water naturally containing an abundance of calcium and magnesium cations through a volume of resin beads containing sodium ions on their active sites. During contact, the calcium and magnesium cations will preferentially migrate out of solution to the active sites on the resin, being replaced in solution by the available sodium ions. This process reaches equilibrium with a much lower concentration of calcium and magnesium cations in solution, thereby "softening" the water. The resin can be recharged periodically by reacting it with a solution containing a high concentration of sodium ions, such as a sodium chloride solution. The calcium and magnesium cations accumulated on the resin will migrate off it, being replaced by the sodium ions from the salt solution until a new equilibrium state is reached.

In the case of anion exchangers, the media exchanges one negatively charged ion for another. For example, the functional groups on the media may be in the chloride form which can be exchanged for sulfate ions in solution. As a result, sulfate is removed from the water and chloride is added to the water. In the case of a weak anion exchanger, a $NH_2$ functional group is typically attached to the polymer backbone of the resin bead. It reacts with an acid like HBr contained in wastewater as follows:

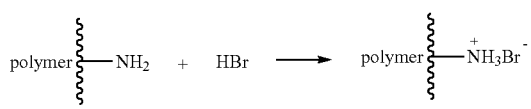

thereby removing the acid from the wastewater and attaching it to the resin beads via a chemical bond. This $NH_2$ functional group pre-attached to the polymer backbone represents an amine derivative. Such a weak anion exchange medium is generally effective for adsorbing sulfates from wastewaters under acidic conditions. The resin beads can be regenerated by treating them with NaOH or $Ca(OH)_2$.

By contrast, a strong anion exchanger generally constitutes a polymer backbone to which is pre-attached an amine salt in a charged state. It will react directly with charged anions contained in the wastewater to exchange the charged anion on the resin into solution for the charged anion contaminant as follows:

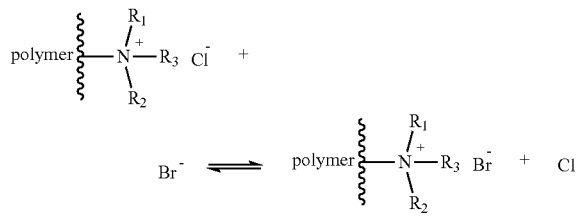

This type of strong anion exchange resin is effective at adsorbing sulfate contaminants under less acidic conditions and therefore over a broader pH range than is the case for weak anion exchangers. Such strong anion exchangers may be regenerated by a salt like NaCl to liberate the accumulated $Br^-$ anion contaminant.

Amines represent a useful functional group for converting a polymer resin into a useful anion exchange medium. Macroporous weak base anion exchange resins are characterized by tertiary amine groups that are attached to a cross-linked polystyrene matrix. The matrix is commonly prepared using divinylbenzene as a cross-linking agent in the presence of a linear polymer like polystyrene in order to introduce porosity into the formed macroporous matrix. This matrix is then chlorormethylated by a reaction with paraformaldehyde, methanol, hydrochloric acid, or chlorosulfonic acid in the presence of a Friedel-Craft catalyst such as aluminum chloride, zinc chloride, or ferric chloride. The resulting chloromethylated resin beads are washed with water and aminated with dimethyl amine. This type of weak base anion exchanger exhibits excellent adsorption and desorption properties for removal of mineral acids, organic matter, chromates, or formic acid. It can be regenerated by alkalis such as sodium carbonate or ammonium hydroxide. See "Weak Base Anion Exchange Resin: Simplification of Amination Process and Control on SBC, Presented at Ion Exchange Advances, SCI Conference IEX '92 (Churchill College, Cambridge, UK Jul. 12-17, 1992)(M. J. Slater, Editor; Elsevier Applied Science).

Synthetic ion exchange resins are typically used within ion exchange processes. These synthetic resins commonly are formed of small 0.03-2.0 mm beads made from an organic polymer substrate, such as cross-linked styrene and divinylbenzene copolymers. Moreover, these resin beads will feature a highly developed structure of pores on the surface of the resin, which provide the sites for exchanging ions. These resin beads can be converted to cation-exchange resins through sulfonation, or to anion-exchange resins through amination of chloromethylated derivatives.

Thus, U.S. Pat. No. 4,177,331 issued to Amick discloses a sulfone cross-linked polystyrene resin that is useful as a weak or strong anion exchanger. A linear polystyrene is cross-linked with a sulfonating reagent like chlorosulfonic acid, sulfur trioxide, sulfuric acid, and a boron compound such as boric acid or boron oxide. The resulting reaction is controlled to favor the formation of a sulfone cross-linked sulfonyl chloride intermediate. The intermediate may then be converted into either the weak or strong anion exchanger.

U.S. Pat. No. 5,726,210 issued to Teraue at al. teaches the production of an anion exchange resin comprising reacting an aromatic cross-linked haloakyl-containing copolymer with an amine in the presence of water and a water-soluble inorganic salt. Preferred examples of the amine include trimethylamine, triethylamine, dimethylamine, diethylamine, and diethyl ethanolamine.

U.S. Pat. No. 8,846,773 issued to Fukui et al. illustrates an anion exchange resin prepared by polymerizing divinylbenzene with styrene, alkylating the resulting polymer with chloromethyl methyl ether using zinc chloride as a catalyst, and further reacting the compound with trimethylamine. The resulting cross-linked copolymer is then sulfonated to form a sulfonated cross-lined copolymer.

Hexamethylenetetramine (commonly known as "urotropin") represents a useful amine-based reagent that is readily obtainable from ammonia and formaldehyde. It is soluble in water, chloroform, ethanol, and some other organic solvents. It also remains stable at elevated temperatures with a symmetrical adamantine-like structure.

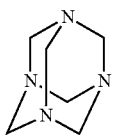

See N. Blazevic, D. Kolbakh, B. Belin, V. Sunjic & F. Kajfez, "Hexamethylenetetramine, A Versatile Reagent in Organic Synthesis" (Georg Theime Publishers; Issue 3, pp. 161-76) (1979).

Moreover, resin-like compounds may be formed from the reaction of phenol with hexamethyltetramine. Although Mortimer Harvey and L. H. Baekland demonstrated the presence of nitrogen in the resulting compound, they failed to show the amine nature of the nitrogen. Moreover, no evidence was provided that this nitrogen behaved like a weak anion exchanger. M. Harvey & L. H. Baekland, "Further Studies of Phenolic Hexamethylenetetramine Compounds", *Journal of Industrial & Engineering Chemistry* (vol. 13, no. 2, pp. 135-41) (1921).

U.S. Pat. No. 4,200,706 issued to Starks discloses the curing of cross-linked phenol-formaldehyde resoles or novalacs at low temperatures and pressures. Divinylbenzene is used as the cross-linking agent along with a small amount of acid catalyst. Normally, the phenol-formaldehyde novalacs require the addition of cross-linking agent. Hexamethylenetetramine is the most commonly used cross-linking agent. Solid hexamethylenetetramine is mixed with a novalac to produce a syrup which will cure upon heating. Such novalacs, when heated at temperatures up to 140° C. form bis- and tri-hydroxybenyl amines. The bis- and tri-hydroxybenzyl amines reacting with an excess of phenol, eliminate nitrogen to produce methylene bridges. At temperatures of from 160° C. temperatures amine linkages undergo further reactions leading to decomposition which produces xanthene and methyl phenols along with further ammonia and methylamine. This procedure is explained in greater detail in the Lin-Gibson, S.; Riffle, J. S., *Chemistry and Properties of Phenolic Resins and Networks. In Synthetic Methods in Step-Growth Polymers*, John Wiley & Sons, Inc.: 2003; pp 375-430. Thus, it has been recognized that reaction novalacs with hexamethylenetetramine can produce benzyl amines. However, these authors did not disclose the production of weak anion exchange resin using reaction of novalacs with hexamethylenetetramine.

This process for producing synthetic resins is expensive. The resin beads are also highly susceptible to "fouling." While soluble organic acids and bases removed by the synthetic ion-exchange resin are shed during regeneration, non-ionic organic materials, oils, greases, and suspended solids also removed from the water tend to remain on the surface of the resin bead. Foulants can form rapidly on the resin, and can significantly hinder performance of the ion-exchange system. Cationic polymers and other high molecular weight cationic organics are particularly troublesome at any concentration. For certain types of resins, even one ppm suspended solids can cause significant fouling of the resin beads over time. Thus, a prefiltration unit in the form of activated carbon or other separation material may need to be positioned upstream of the ion-exchange unit to remove these organic contaminants before the wastewater is passed through the ion exchange resin, further complicating the water treatment process and its costs. The costs associated with this pretreatment can be substantial.

Additionally, resins require regeneration once the ion-exchange sites have been exhausted, for example, as feed water flows through a bed. During regeneration of an ion exchange resin, anions that were previously adsorbed from the wastewater flow are replaced on the resin beads by hydroxide ions. A step known as "backwash" is often employed during regeneration, so that any organic contaminant buildup in the resin can be relieved, thereby allowing free flow of the wastewater through the resin beads. But, chemically-regenerated ion-exchange processes known in the art tend to use excessive amounts of regeneration chemicals, which require periodic and even on-going treatment, as well as safe disposal of the chemical waste. These processes can be complex and expensive to operate.

Peat-Based Sorption Media

It would therefore be desirable to produce an anion exchange medium from a natural, organic material. However, a balance must be struck between the physical and chemical integrity of the form of the anion exchange medium versus the ability of the medium to serve as an anion exchanger.

Phenol-containing organic starting material like peat inherently possesses cation-exchange and adsorbent characteristics. Peat is composed mainly of marshland vegetation, trees, grasses, fungi, as well as other types of residual organic material such as insects and animal remains, and is inhibited from decaying fully by acidic and anaerobic conditions. It is also abundant in many places in the world. For example, 15% of Minnesota is covered by valuable peat resources, comprising 35% of the total peat deposits found in the lower 48 states in the U.S.

Pellets made from peat are known within the industry. For example, U.S. Pat. No. 6,455,149 issued to Hagen et al. discloses a process for producing peat pellets from an admixture of peat moss, pH adjusting agent, wetting agent, and other processing additives. The resulting granules can be easily broadcast spread on the ground, and returned to their original peat moss form upon wetting to act as a fertilizer. U.S. Pat. No. 3,307,934 issued to Palmer, et al. shows another fertilizer product containing peat, and water-soluble inorganic fertilizer salt like diammonium phosphate, sulfate of potash, or urea. However, neither of these products are capable of being used as an anion exchange medium.

Russian Patent No. 2,116,128 issued to Valeriy Ivanovych Ostretsov teaches a process for producing a peat sorbent useful for removing oil spills from solid and water surfaces. The peat material is dried from 60% moisture to 23-25% moisture, and then compressed at 14-15 MPa pressure into briquettes. Next, these peat briquettes are heated at 250-280° C. without the use of additional hydrophobic chemicals and without air. The humic and bitumen fractions within the peat mobilize to the surface of the peat briquettes to produce a natural hydrophobic coating. This hydrophobic coating is necessary for the peat briquettes to be able to soak up oil. Ostretsov also reduces the moisture of his heat-treated peat briquettes all the way down to 2.5-10% wt. moisture. This significant water reduction assists with the hydrophobic coating formation and frees up the pores in the peat material so that they are available to soak up oil. See also Russian Patent No. 2,173,578 also issued to Ostretsov.

It is also known in the wastewater treatment industry to use pellets made from peat or other natural organic materials as a pollution filtering medium. For instance, U.S. Pat. No. 5,624,576 issued to Lenhart et al. illustrates pellets made from leaf compost, which are then employed to remove pollutants from storm water. U.S. Pat. No. 6,143,692 issued to Sanjay et al. discloses an adsorbent made from cross-linked solubilized humic acid, which can be employed for removing heavy metals from water solutions. See also U.S. Pat. No. 6,998,038 issued to Howard; U.S. Pat. No. 6,287,496 issued to Lownds; U.S. Pat. No. 5,578,547 issued to Summers, Jr. et al.; and U.S. Pat. No. 5,602,071 issued to Summers, Jr. et al. However, all of these prior art references disclose sorption media useful for sorbing heavy metals or other cations—not anion exchange media useful for removing anions from wastewater or other aqueous solutions.

Peat as a Cation-Exchange Media

Various efforts have been made to prepare cation-exchange mediums from peat starting material which is activated and, in some cases, chemically modified before the chemical activation step. These sorbents are designed to remove cations like cadmium, zinc, copper, etc. from wastewater. Cation exchange media generally use carboxylic acid (COOH) groups or $SO_3^-$ groups attached to the peat substrate to attach and therefore remove the cations from the wastewater. For instance, U.S. Pat. No. 4,778,602 issued to Allen, III teaches a multi-functional filtering medium consisting of highly humified peat which is treated with an alkaline solution to hydrolyze the humic and fulvic acid fractions contained therein. Next, the peat product is treated with a quaternary amine solution to precipitate out the humic and fulvic acid fractions from the peat. After filtering the dried the peat cake, nitric acid or sulfuric acid is added to neutralize the amine to chemically modify the peat to increase its cation exchange sites by either adding $SO_3^-$ groups to the peat surface structure, or to oxidize the organic carbon to improve the cation exchange capacity. Finally, the peat residue may be treated by a semi-coking process step at 200-1000° C. at a 40 psi pressure, thereby allowing carbonization of peat residue. But, this will actually destroy the carbon fibers. The enhanced cation exchange capacity is also aided by destruction of the carbon fibers via the semi-coking (pyrolyzation) step.

U.S. Pat. No. 6,042,743 issued to Clemenson discloses a method for processing peat for use in contaminated water treatment. Clemenson mixes raw peat with heated sulfuric acid to produce a sulfonated peat slurry. After cooling and drying the slurry admixture to a 60-70% moisture content, he adds a binder like bentonite clay to coagulate the acidic peat slurry, extrudes pellets, and then bakes the sulfonated peat pellets in an oven at 480-540° C. His procedure will add sulfonic groups (—$SO_3^-H$) to the resulting peat granules, thereby increasing cation-exchange capacity. See also U.S. Pat. No. 6,429,171 issued to Clemenson.

In yet another example, U.S. Pat. No. 5,314,638 issued to Morine discloses a chemically-modified peat product that can be used as a cation-exchange material. This peat material is air dried and milled to a size of one mm or less; hydrolyzed in an aqueous hydrochloric acid solution to remove the soluble components (sulfuric acid and nitric acid may also be used); further treated in an extractor with 2-propanol/toluene solvent to remove the solvent-soluble bitumen; dried to remove the residual solvent; and then immersed in a hot concentrated sulfuric acid bath at 100-200° C. for 1-4 hours. The hot sulfuric acid bath process step comprises chemical modification in which the sulfuric acid reacts with the peat fibers to add sulfonic groups ($SO_3^-H$) to its surface. These acid groups attract metals via a cation exchange mechanism. But in all of these cases, the prior art products are acting as cation exchange media for removing heavy metals or other cations—not anion exchange media useful for removing anions from wastewater or other aqueous solutions.

Challenges Faced by Peat and Other Natural Organic Materials as Anion Exchange Media But, the large body of available research illustrates the underlying shortcomings for natural peat for use as an anion exchanger. First, peat starts out with zero anion exchange capacity. The peat-based cation exchange media known in the prior art will not work to remove anions from wastewaters or other aqueous solutions.

Second, in its natural form, peat has low mechanical strength, tends to shrink and swell, and does not allow for hydraulic loading. Naturally-occurring organic ion exchange media are unstable outside a moderately neutral pH range. Thus, any peat-based anion exchanger must be modified to increase its physical stability, particularly within high-pH conditions.

Third, such natural organic ion exchange media like peat tend to be prone to excessive swelling and peptizing, and tend to leach naturally occurring heavy metals from the substrate material into the treated wastewater solution.

Fourth, prior art steps commonly applied to peat and other organic materials like pyrolysis can cause these materials to lose their ion-exchange capacity. Carbonization may cause considerable shrinkage and weight loss of the materials, as well as loss of naturally-occurring phenolic compounds.

While the processes known in the art for the preparation of sorption material sourced from natural solid organic material like activated carbon have been useful for certain limited applications, for many anion exchangers it will be necessary to introduce new functional groups to the surface of the natural materials. Also, once an anion exchange media has been used and the functional groups are exhausted, it is necessary to follow the sorption step with a regeneration step where bases like $Ca(OH)_2$ or NaOH are used to remove the anions from surfaces of the spent anion exchanger. This step requires a physical stability of an anion exchanger at high pH environment. It is therefore necessary to develop a low-cost process for producing an anion-exchange media sourced from natural organic starting material that exhibits good natural anion-exchange capacity and good physical stability at high pH, so that the medium can be utilized in a wider range of end-use applications, including the removal of anions like sulfates from industrial wastewaters.

But peat provides another chemical challenge to the production of anion exchange medium. The prior art polymer-based weak anion exchangers discussed above added amine functional groups to the polymer backbone in the absence of any phenol groups being present to participate in the resulting reaction. However, peat naturally contains phenol groups within the humic acid, fulvic acid, and lignin fractions of the peat material, and it would be desirable to take advantage of those phenolic structures to add amine functional groups to the peat matrix.

The well-known "Duff Reaction" involves the treatment of a phenol with hexamethylenetetramine in an acidic media provided by, e.g., acetic acid, trifluroroacetic acid, hydrochloric acid, or sulfuric acid, followed by hydrolysis in order to produce a desired salicylaldehyde as follows.

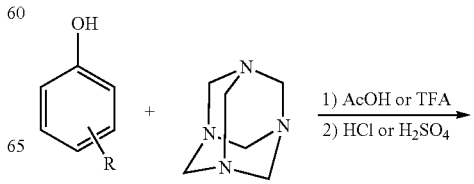

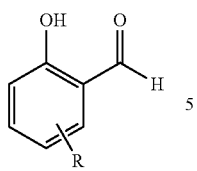

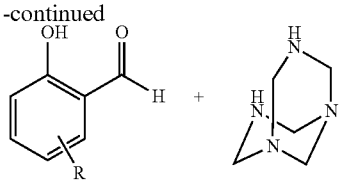

The advantage of this Duff Reaction formulation is that it combines inexpensive and easily available reagents with a tolerance for traces of moisture. Moreover, it is comparative with a wide variety of functional groups represented by R. See Y. Ogata, A. Kawasaki & F. Sugiura, "Kinetics and Mechanism of the Duff Reaction", *Tetrahedron* (vol. 24, pp. 5001-5010) (1968); I. S. Belostotskaya, N. L. Komissarova, T. I. Prokof'eva, L. N. Kurkovskaya & V. B. Voleva, "New Opportunities for Duff Reaction", *Russian Journal of Organic Chemistry* (vol. 41, no. 1, pp. 703-06) (2005).

However, the product resulting from this Duff Reaction contains an aldehyde functional group instead of the amine functional group that is desirable for a weak anion exchange medium, despite the fact that hexamethylenetetramine was reacted with the phenol-based starting substrate. The researchers in N. Grimblat, A. Sarotti, T. Kaufman & S. Simonetti, "A Theoretical Study of the Duff Reaction: Insights Into Its Selectivity," *Organic & Biomolecular Chemistry*, (vol. 14, pp. 10496-10501)(2016) propose the following reaction mechanism:

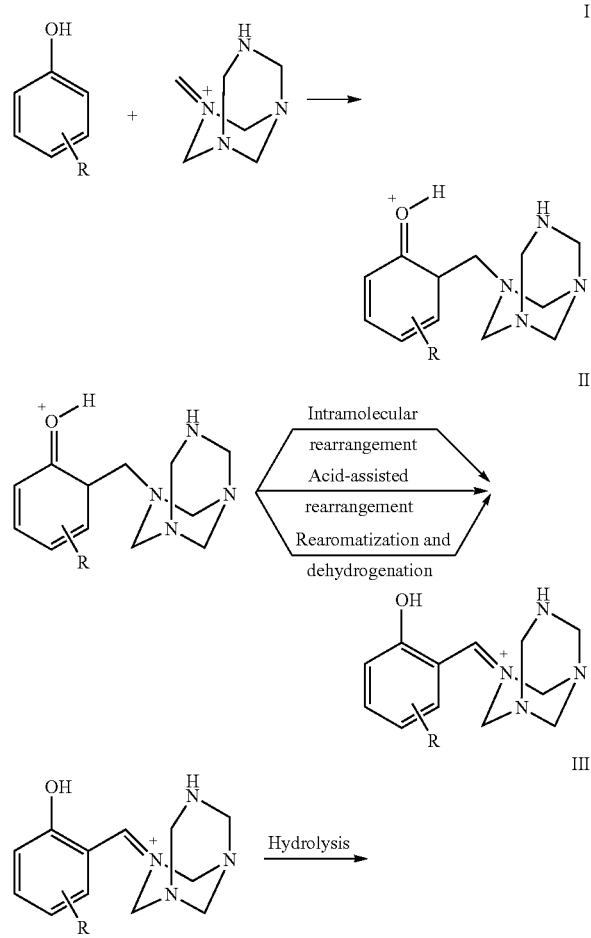

As can be seen from the mechanisms of the Duff Reactions in Equations I, II, and III, an amine can be formed as an intermediate in the Duff Reaction. However, in the normal course of the reaction, the amine ultimately gives rise to the aldehyde moiety. The present invention capitalizes on the discovery that the Duff Reaction can be halted at the amine intermediate step without proceeding to the aldehyde.

SUMMARY OF THE INVENTION

A process for the preparation of a granulated or pelletized weak anion exchange medium from a phenol-containing organic material like peat is provided by this invention. Following granulation of the peat material, the granules or pellets are subjected to a low-temperature pyrolysis process known as "torrefaction" to produce a high degree of granule or pellet physical stability at high-pH conditions. The temperature inside the mixer used to torrefy the peat granules or pellets should be about 175-300° C., preferably about 200-275° C., more preferably about 265° C. The time period for the torrefaction process should be about 25-200 minutes, preferably about 150 minutes.

The torrefied peat granules are then subjected to a chemical pretreatment via a hydrolysis reaction with a reagent like sodium carbonate to remove the remaining humic acid and fulvic acid fractions from the peat granules. The surface of the hydrolyzed peat granules may then optionally be treated with an acidic surface preparation reagent like HCl to prepare the granules for the subsequent amination step.

The torrefied, hydrolyzed, and preferably surface acid treated peat granules are then subjected to the main chemical reaction via either separate aldehyde and amine reagents, or an adduct reagent like hexamethylenetetramine, to add the necessary amine groups to the peat granule surface for a weak anion exchange media. For purposes of this Application, the aldehyde reagent may be selected from the group consisting of formaldehyde (HCHO), acetic aldehyde ($CH_3CHO$), propionic aldehyde ($C_2H_5CHO$), butyric aldehyde ($C_3H_7CHO$), or benzaldehyde, while the $R_1NH_2$ function amine reagent may be selected from the group consisting of ammonia ($NH_3$), methyl amine ($CH_3NH_2$), ethylamine ($C_2H_5NH_2$), propylamine ($C_3H_7NH_2$), iso-propylamine ($C_3H_7NH_2$), or butylamine ($C_4H_{11}NH_2$). This main chemical reaction step should be carried out at a temperature of about 100-140° C., preferably 120° C. for a reaction time period of about 1-24 hours, preferably 8 hours. While hexamethylenetetramine represents the preferred chemical amination reagent for purposes of this invention, other adduct reagents like 1,3,5-trimethylhexahydro-1,3,5-triazine; 1,3,5-tripropyl-1,3,5-triazinane; 1,3,5-triethyl-1,3,5-triazinane; and hexahydro-2,4,6-trimethyl-1,3,5-triazine may be used.

The torrefied, chemically-treated $APTsorbNH_2$ peat granule product produced in accordance with this invention provides a beneficial combination of granule hardness, physical stability at high pH conditions of 10-12, and anion exchange capacity due to the functional amine groups attached to the phenol constituent within the peat material, and a high level of breakthrough capacity for loading the anions onto the active surface sites of the peat granule. The weak anion exchange media product exhibits a nitrogen content of at least about 3.0% wt. Alternatively, the nitrogen content of the resulting weak anion exchange media product may be defined as being at least about 0.5% wt higher than the nitrogen content of the phenol-containing organic material used as the starting substrate for the preparation of the weak anion exchange media. The anion exchange capacity of the weak anion exchange media should also be about 58-80 mEq/100 g.

The weak anion exchange medium of this invention can be used in a variety of aqueous solution treatment processes, such as wastewater treatment for removing mineral acids like $H_2SO_4$, $HNO_3$, HCl, HBr, HF, $H_3PO_4$, HI, or formic acid from the wastewater. The resulting anion exchanger medium is particularly useful for treating wastewaters in a low-pH environment.

DETAILED DESCRIPTION OF THE PREFERRED EMBODIMENT

Figure 1:
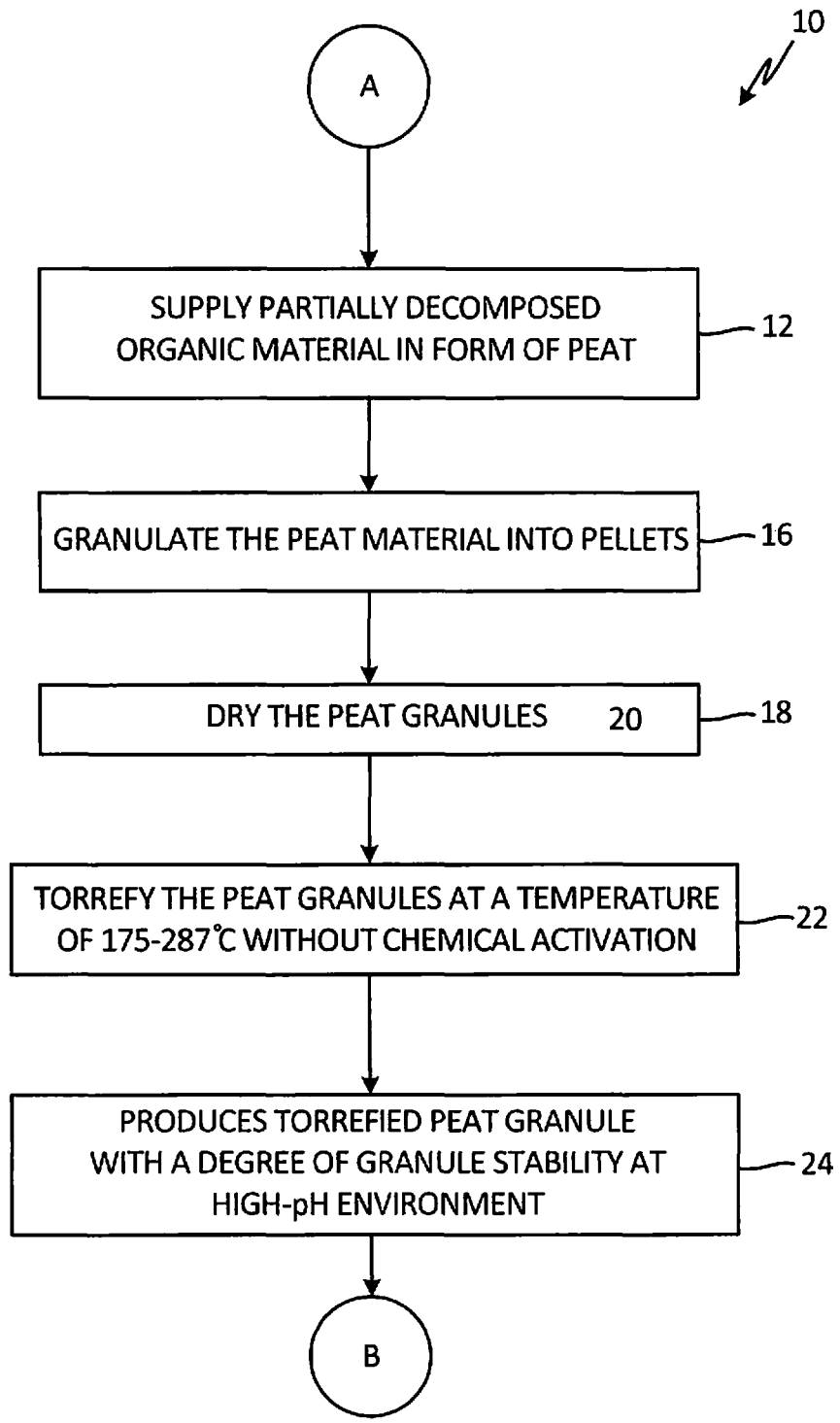
FIG. 1 represents a schematic view of the portion of the process for preparing the thermally-treated peat granule.

A process for the preparation of a granulated or pelletized weak anion exchange medium from a phenol-containing organic material like peat, followed by low-temperature pyrolysis known as "torrefaction" of the medium to produce a high degree of granule or pellet physical stability at high-pH conditions, followed by chemical pretreatment of the hardened granule or pellet via a hydrolysis reaction with sodium carbonate, and optionally surface treatment with acids, followed by the main chemical treatment of the hydrolyzed granule or pellet via separate aldehyde and amine reagents, or alternatively via an adduct reagent like hexamethylenetetramine, to produce the end product with the desired weak anion exchanger characteristics is provided by this invention. The weak anion exchange medium of this invention can be used in a variety of aqueous solution treatment processes, such as wastewater treatment for removing mineral acids like $H_2SO_4$, $HNO_3$, HCl, HBr, HF, $H_3PO_4$, HI, or formic acid from the wastewater. The resulting anion exchanger medium is particularly useful for treating wastewaters in a low-pH environment.

For purposes of this invention, "phenol-containing organic material" means carbon-based organic materials that are naturally-occurring, plant-based, or partially decayed or decomposed-over-time in the ground that contain phenol groups or aromatic hydrocarbons with phenolic moieties. Such phenol-containing organic material covers a variety of substances including without limitation peat, lignin and lignin derivatives, leaf compost media, plant by-products, lignite coal, partially-decomposed wood, and combinations thereof. Compost media is any decayed organic matter. Plant by-products may include partially decomposed plants, leaves, stalks, and silage, for example.

As used in this Application, "aqueous solutions" means any water-based solution containing an environmental impurity as a solute produced by manufacturing, agricultural, or mining industries or population communities. Examples include, without limitation, wastewater discharges; industrial streams; storm water runoffs; mine dewatering streams from mining pits; animal slaughterhouse, cattle-yard, and other agricultural runoffs; spent processing waters emanating from mining, grinding, milling, metallurgical, or extraction process; and hydrofracking.

For purposes of this invention, "impurities," "contaminants," or "aqueous contaminants" means any chemical element or compound negatively charged ion (i.e., anion) found in an aqueous solution that poses a health risk to humans or animals, or is otherwise subject to environmental laws or regulations, including without limitation, a mineral acid form of such contaminant such as $H_2SO_4$, $HNO_3$, HCl, HBr, HF, $H_3PO_4$, HI, or an organic acids form of such contaminant such as HCOOH, $CH_3$, COOH, $C_2H_5$ COOH.

As used in this Application, "particles" includes any three-dimensionally hardened shaped product formed from the phenol-containing organic material, including, without limitation, granules or pellets.

The term "mEq" means milliequivalents. The equivalent is a common unit of measurement used in chemistry and the biological sciences. It is a measure of a substance's ability to combine with other substances. The equivalent entity corresponding to the transfer of a $H^+$ ion in a neutralization reaction, of an electron in a redox reaction, or to a magnitude of charge number equal to 1 in ions. In ion exchange reactions, one Eq of a substance is equal to one divided by the valence of the substance (i.e., the number of electrons that the substance would engage in participating in the reaction). Because, in practice, the expression of the equivalent is often very numerically small, it is frequently described in terms of milliequivalents (mEq). A mEq is 1/1000 of an equivalent.

The term "physical stability at high pH environment" means that material is not losing structural integrity after being refluxed for eight hours in a 1 mol/L solution of $Na_2CO_3$ in water, typically at a pH condition of 10-12.

The terms "empty bed contact time" means the time required for a liquid in a carbon adsorption bed to pass through a carbon column, assuming all liquid passes through at the same velocity. It is equal to the volume of the empty bed divided by the flow rate.

The term "about" means approximately or nearly, and in the context of a numerical value or range set forth herein means±2% of the numerical value or range recited or claimed.

The term "µg" means microgram or one-millionth of a gram or one one-thousandth of a milligram.

While the anion exchange medium of the present Application is described using peat as the phenol-containing organic matter starting material, it should be understood that the invention is not limited to peat-based material. Likewise, the end-use applications for the anion exchange media of the present invention extend well beyond the treatment of sulfate constituents in wastewater streams described in this Application.

Production Process for Torrefied Material

The process for preparing for the weak anion exchange medium product 10 of the present invention where the torrefied material 24 having a high degree of granule stability within a high-pH environment is depicted in FIG. 1 where peat is used as the starting phenol-containing organic material 12. A variety of different types of peat may be used for purposes of this invention, including without limitation, reed sedge, sphagnum peat, high moor peat, transitional moor, and low moor peat. The peat material should be dug from the ground and used in its natural state without any further decomposition process steps. It may, however, be cleaned to remove sticks, stones, and other foreign debris from the fibrous peat material, and it may be pre-dried to a lower moisture content.

The peat material 14 is then introduced to a granulating machine 16, such as one sourced from Andritz, Inc. of Bellingham, Wash. The loose, fibrous peat material 14 will be tumbled inside the drum of the granulator to cause the fibers to adhere to each other, and build up granules of desired size. A binder additive like lignosulfonate may be optionally added to the peat material in the granulator drum to assist this granulation process.

Alternatively, the loose peat material 14 may be introduced to an extruder. This extruder will apply pressure to the fibrous material to produce pellets of desired size. Such an extruder may be sourced from J.C. Steele & Sons of Statesville, N.C.

Next, the resulting peat granules or pellets 16 are sent to a dryer 18 such as a belt or rotary dryer sourced from Harris Group of Atlanta, Ga. Using direct heat, the peat granules or pellets will travel through the length of the dryer having an inlet temperature of about 400° C. and an outlet temperature of about 80° C., so that the natural moisture level of the peat material contained in the peat granules or pellets will be reduced to about 10-14% wt moisture. Thus, this drying step 18 should be carried out across a temperature range of about 80-400° C. with the preferred temperature of exposure being about 90° C. for about 45 minutes.

The resulting dried peat granules or pellets 20 are then crushed and screened to an appropriate size of about 6 mesh×30 mesh to 30×100 mesh.

The dried peat granules or pellets 20 called "bioAPT" are then introduced to a thermal treatment step 22, known as "torrefaction." As commonly understood within the industry, "torrefaction" is a medium-temperature, thermochemical process, commonly carried out around 250-300° C. on biomass material for a period of time in an oxygen-deprived environment. During the torrefaction process, moisture and volatiles are removed from the biomass material, increasing the energy density of the material. Through the torrefaction process, the biomass material becomes hydrophobic and increases its resistance to microbial growth and decomposition. The torrefaction process is typically used to increase the shelf life of the biomass material and facilitate transportation of the material. It can also be used to improve the grindability of wood and straw. The torrefied biomass material can be used for fuel, replacing coal, or for co-firing with coal, for example. The torrefied biomass material can also be used as feeder stock for the production of biofuels such as syngas or bio-oils.

In the case of peat, it naturally has carbohydrates in it, which naturally undergo a thermochemical decomposition during a heat treatment process to produce lactones, which are then broken down into hydroxy acids that react with natural polymers found within the peat material to cross-link, and as a result to harden the peat granule.

The peat granule or pellet is introduced into a jacketed ribbon mixer that has thermal fluid like oil circulating through the jacket. This thermal liquid is maintained at a temperature of about 300° C. to effectively heat up the atmosphere inside the ribbon mixer. The mixer is also fitted with "lifters" inside its interior chamber, which pick up the peat granules 20 and drop them through the atmosphere inside the ribbon mixer. The interior chamber is also oxygen-deprived. This exposure to the hot, inert atmosphere is critical to bringing the granule up to temperature as quickly as possible.

During this torrefaction process 22, a unique combination of time and temperature are critical for the production of the torrefied peat granule material. Thus, the temperature inside the mixer used to torrefy the peat granules should be about 175-300° C., preferably about 200-275° C., more preferably about 265° C. The time period for the torrefaction process should be about 25-200 minutes, preferably about 150 minutes for achieving maximum stability of the peat granules at higher pH conditions without losing phenol-containing compounds.

More specifically, the temperature of the thermal fluid is quickly raised to approximately 300-320° C., more preferably 304° C., to torrefy the peat granules to increase their stability at a high-pH environment. The temperature inside the mixer slowly rises as volatiles and contained moisture are driven off. This gasified water and volatile mix constitutes the "inert" atmosphere, and work to purge oxygen from the ribbon mixer.

As the temperature in the atmosphere inside the mixer climbs into the 204° C. range, the rapid breakdown of hemicellulose begins. This is the same reaction as torrefaction of wood. This breakdown of hemicellulose is an exothermic chemical reaction which allows for a rapid rise in the temperature of the atmosphere inside the mixer. The actual temperature of the granule is hard to determine but probably is much lower.

At the 60-minute mark, the temperature of the heating fluid contained inside the jacket of the mixer is lowered to 274° C., thereby allowing hemicelluloses decomposition and the decarboxylation reaction to continue as the temperature inside the mixer is driven into the 270° C. range. This torrefaction process 22 is allowed to continue until approximately 150 minutes has passed at which point the temperature inside the mixer has been maintained at about 265° C. The heating process is stopped at this point, and water is injected in order to rapidly cool the product and stop the torrefaction process. Target moisture for the finished product should be at least 10% so as to prevent the thermally activated peat granules from becoming too hydrophobic. Danger of fire developing within the bagged product is greater if the finished product has less than 5% moisture content. The physical appearance of the torrefied peat granules 24 is not substantially different from its starting non-torrefied material.

It has been found that 150 minutes represents an optimal compromise as a torrefaction step time duration for achieving desirable levels of both granule stability at higher pH levels and reactivity with chemical reagents comprising aldehydes and amines. It is this unique combination of temperature and time in the torrefaction process 22 of the present invention that produces the torrefied peat granules 24 exhibiting a high degree of granule stability at a high-pH environment.

Note that the torrefaction process 22 of the present invention is materially different from the "thermal activation" process applied in the prior art to peat granules which can also be carried out in a ribbon mixer. Nor does it bear any resemblance to "chemical activation" processes of the prior art. Thermal activation is normally applied in the industry to activated carbon material to increase its surface area.

Activation (IUPAC Recommendations 1996) can be defined as input of external energy into a chemical system to bring about activation of the system. This activation will initiate or expedite thermochemical reactions. In the case of thermal activation, heat as a form of energy is first provided by the thermal fluid circulating in the ribbon mixer. This heating process results in the chemical reaction-decomposition of hemicellulose, which occurs naturally in partially decomposed plant matter such as peat. The decomposition of hemicellulose is itself exothermic, as evidenced by a continuing rise in atmospheric temperature even when the heat input of the thermal fluid is stopped. As it decomposes and gives off heat, hemicellulose is converted to highly reactive, cyclic molecules called lactones. Some of these lactones escape the reaction zone along with moisture, but given the correct starting temperature and duration, the bulk of the lactones remain within the reaction zone and undergo a cross-linking polymerization with the natural matrix of the peat. This cross-linking reaction of the humic acid and fulvic acid fractions in peat is the result of the exothermic reaction of thermal decomposition of hemicelluloses, but does not destroy the carboxylic acids inside the peat. The thermal activation process is carried out for a much shorter time period inside the mixer on the order of 20-30 minutes, instead of the approximately 150 minutes torrefaction time period of the present invention. The thermal activation processes may result in increasing the hardness and surface area and sorption sites on the exterior of the peat material. But such properties are important for an adsorption process, not an ion exchange process.

By contrast, the torrefaction process 22 using substantially longer heating of the peat granules under the present invention proceeds far beyond any cross-linking stage. Instead, the active cation exchange sites on the exterior surface of the peat material will be destroyed, which is acceptable because the goal of the present invention ultimately is to remove carboxylic acid and ester groups and to retain the phenolic groups in order to preserve them for a subsequent chemical reaction to produce an anion exchange medium.

Chemical Treatment Process for the APTsorb $NH_2$ Weak Anion Exchange Medium

Figure 2:
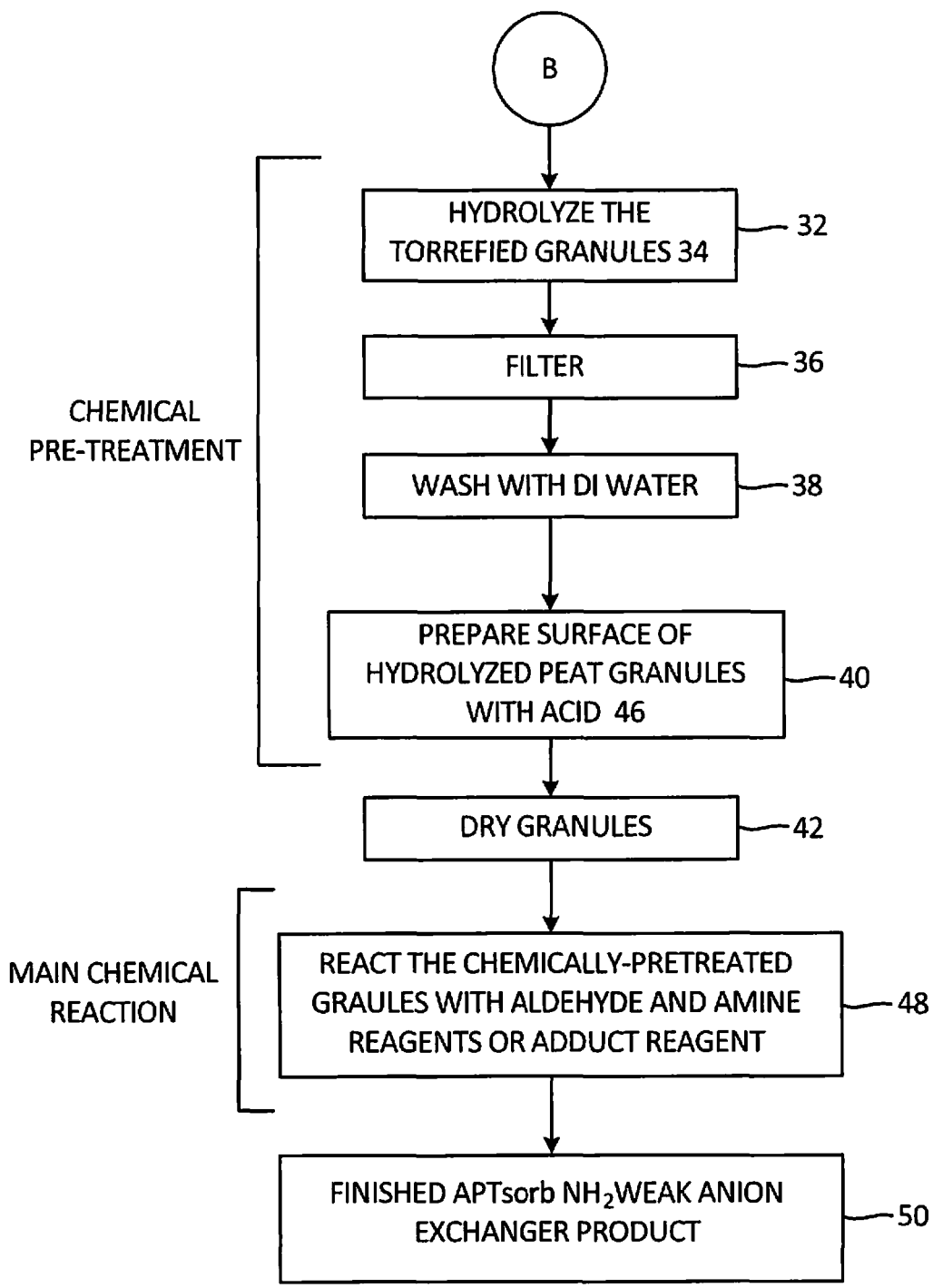
FIG. 2 represents a schematic view of the portion of the process for chemically treating the thermally-treated peat granule by means of hydrolysis followed by a reaction of the resulting hydrolyzed peat granules with a combination of an aldehyde reagent and an amine reagent, or hexamethylenetetraamine alone, to add the functional amine groups to the exchanger end product.

A chemically-treated, thermally-treated weak anion exchange medium called "APTsorb $NH_2$" is shown in FIG. 2. This chemical pre-treatment process 30 occurs after the torrefaction step 22.

The torrefied peat granules 24 are treated in a hydrolyzation step 32 to remove the remaining humic acid and fulvic acid fractions from the peat granules. If the torrefaction process step 22 was performed correctly, the granular structure of the peat granules will still be intact after the hydrolysis step 32. The hydrolyzation reagent may be NaOH, KOH, $NaHCO_3$, $K_2CO_3$, or $KHCO_3$, preferably $Na_2CO_3$. A 1M solution of the $Na_2CO_3$ reagent is preferably used. An amount of 2.5 L of the 1M $Na_2CO_3$ reagent is used per 500 g of the torrefied peat granules 24, preferably 5 L/1 kg of granules. This hydrolyzation step 32 should be carried out for a time period of 1-20 hours, preferably 8 hours.

Following the hydrolysis step 32, the peat granules are then filtered 36 to remove any solid particulates. The granules are then washed with deionized water 38 to remove any residual hydrolyzation agent.

Next, the surface of the hydrolyzed peat granules 32 may optionally be prepared for the forthcoming amination reaction. The surface preparation reagent used in this step 40 may be an acid such as $H_2SO_4$, $HNO_3$, $CH_3COOH$, HCOOH, or HCl. It preferably is HCl with 2.5 L of a 1 M solution of HCl being added to the hydrolyzed, filtered, and washed granules, and the resulting admixture refluxed for three hours.

The hydrolyzed and acid-treated peat granules are then filtered, washed with deionized water to remove any residual chloride ions, and dried at a temperature of about 105° C. for a time period of about 8 hours, preferably 24 hours. Thus, this two-step Chemical Pretreatment 44 of the peat granules using the $Na_2CO_3$ hydrolyzation reagent, followed by the HCl acid surface treatment of the peat granules is preferred for purposes of the present invention.

A $Cl^-$ test may be employed to indicate the presence of chloride ions where HCl was used as the surface reactive agent by adding 0.5 ml of a 1% solution of $AgNO_3$ to a 20 ml sample of the rinse water. If $Cl^-$ ions are present, a white precipitate in the form of AgCl will form immediately within the rinse water to evidence the need for additional rinsing of the Chemically Pretreated peat granules before the drying step.

While the loss of peat material within during this Chemical Pretreatment step(s) 44 is inevitable, it should be controlled to be below about 32%. The higher the loss of peat material during this Chemical Pretreatment step(s) 44, the less stable will be the final product as a weak anion exchanger.

Next, the Chemically-Pretreated peat granules 44 are subjected to the Main Chemical Treatment step 48 to add functional amine groups to the peat granules to produce the desired weak anion exchange characteristics in the APTsorb $NH_2$ end product 50. An aldehyde reagent in combination with an amine reagent may be used as shown in the equation below.

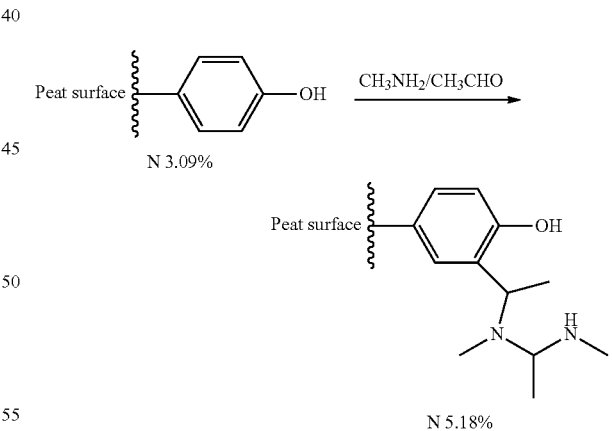

For purposes of this Application, the aldehyde reagent may be selected from the group consisting of formaldehyde (HCHO), acetic aldehyde ($CH_3CHO$), propionic aldehyde ($C_2H_5CHO$), butyric aldehyde ($C_3H_7CHO$), or benzaldehyde.

For purposes of this Application, the $R_1NH_2$ function amine reagent may be selected from the group consisting of ammonia ($NH_3$), methyl amine ($CH_3NH_2$), ethylamine ($C_2H_5NH_2$), propylamine ($C_3H_7NH_2$), iso-propylamine ($C_3H_7NH_2$), or butylamine ($C_4H_{11}NH_2$).

This Main Chemical Treatment step 48 should be carried out at a temperature of about 100-140° C., preferably 120° C., for a reaction time period of about 1-24 hours, preferably 8 hours. The peat granules reacted with this aldehyde reagent in combination with the amine reagent are then filtered, washed with water until there is no color leaching, and then dried at a temperature of about 105° C. for a time period of about 24 hours.

Instead of separately reacting an aldehyde reagent and an amine reagent with the Chemically-Pretreated peat granule in the Main Chemical Treatment step 48 as described above, the reagent may comprise an adduct of an aldehyde and an amine constituting a single compound. This adduct reagent may be selected from the group consisting of hexamethylenetetramine; 1,3,5-trimethylhexahydro-1,3,5-triazine; 1,3,5-tripropyl-1,3,5-triazinane; 1,3,5-triethyl-1,3,5-triazinane; and hexahydro-2,4,6-trimethyl-1,3,5-triazine. The preferred adduct reagent for purposes of this invention is hexamethylenetetramine with the equation for this use of hexamethylenetetramine shown below.

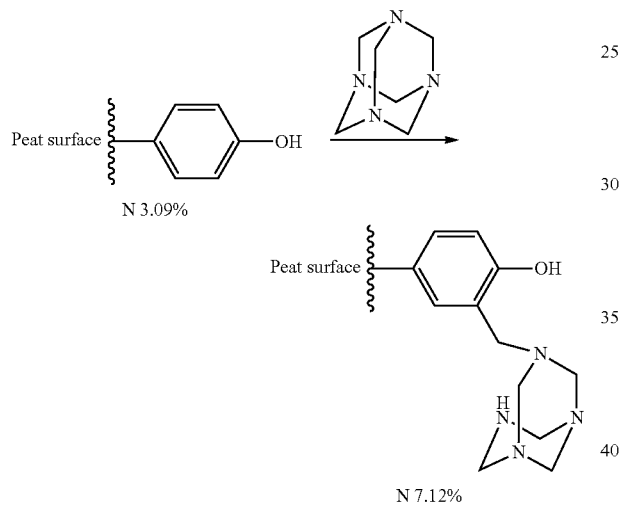

Like the equation shown above for the main chemical treatment step 48 using the separate aldehyde reagent and amine reagent, a functional amine group is successfully attached to the phenol group in the peat material within the peat granules to provide anion exchange capacity to the end product 50.

Thus, the present invention of this Application produces a torrefied, chemically-treated APTsorb $NH_2$ peat granules that provide a beneficial combination of granule hardness, physical stability under high-pH conditions (e.g., 10-12, and anion exchange capacity due to the functional amine groups attached to the phenol constituent within the peat material, and a high level of breakthrough capacity for loading the anions onto the active surface sites of the peat granule. The anion exchange capacity of the weak anion exchange media should also be about 58-80 mEq/100 g. The weak anion exchange media product also exhibits a nitrogen content of at least about 3.0% wt. Alternatively, the nitrogen content of the resulting weak anion exchange media product may be defined as being at least about 0.5 wt higher than the nitrogen content of the phenol-containing organic material used as the starting substrate for the preparation of the weak anion exchange media.

The achievement of the high anion exchange activity and breakthrough capacity characteristics of this APTsorb $NH_2$ medium is all the more surprising given the fact that the Duff Reaction of the prior art predicts that functional amine groups cannot be attached to phenol groups, thereby rendering a peat-based anion exchange medium unachievable. But, a peat-based weak anion exchange medium 50 prepared in accordance with this invention has been achieved.

In an alternative embodiment of the weak anion exchange media of the present invention, the media may be prepared from granules produced from phenol-containing organic material like peat, followed by the Main Chemical Treatment 48 comprising either a separate aldehyde reagent and amine reagent, or an adduct reagent of an aldehyde and an amine to attach at least one amine group to the granule. The adduct reagent may constitute hexamethylenetetramine. Thus the weak anion exchange media of this embodiment is not subjected to the torrefaction 22 and chemical pretreatment (hydrolyzation or hydrolyzation and acid surface treatment) 44 steps described above. While the resulting product may not exhibit as favorable of nitrogen content and anion exchange capacity properties as the weak anion exchange media that are subject to such torrefaction and chemical pretreatment steps, the weak anion exchange properties are still good.

The following examples illustrate the process of the present invention for producing the APTsorb $NH_2$ medium anion exchange 50 from phenol-containing organic matter.

Example 1—Torrefaction of Peat Granules

The process used to produce the torrefied intermediate product 24 is illustrated as follows:

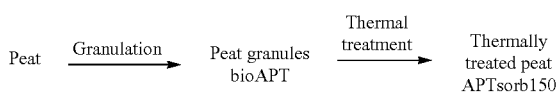

Peat of a reed-sedge type commercially available from American Peat Technology, LLC of Aitkin, Minn., was first dried to a moisture content of about 40% wt. The dried raw peat was extruded into pellets, dried again to reduce the moisture content to about 12% wt, and finally crumbled and sieved. This process resulted in a multifunctional granular media called "bioAPT."

The finished bioAPT peat granule with a size range of 10×30 mesh was then thermally treated to produce the torrefied peat granule media. The bioAPT granules were introduced into a jacketed ribbon mixer. The mixer had thermal fluid circulating through the jacket at a temperature of about 300° C., thereby effectively heating the atmosphere inside the mixer. Additionally, the mixer ribbons were fitted with "lifters" that picked up the media and dropped it through the heated atmosphere. Also, the design of the mixer and the resulting chemical reactions resulted in a nearly oxygen-free atmosphere inside the mixer. At the 60 minute mark, the temperature of the fluid in the jacket was reduced to 274° C., and that temperature was maintained for the duration of the procedure.

Samples of the torrefied peat granules were removed from the mixer after approximately 32, 60, 90, 120, and 150 minutes at which point the chemical reactions necessary for torrefaction, decarboxylation, and crosslinking polymerization were completed for those samples. The media samples were then quickly cooled using a water spray. These samples are shown in Table 1 as APTsorb32, APTsorb60, APTsorb90, APTsorb120, and APTsorb150 intermediate product, respectively, along with the ribbon mixer jacket thermal fluid temperature, and interior temperature conditions for each sample.

TABLE 1

Torrefied APTsorb intermediate products.

| Sample | Thermal treatment time (min) | $T_{jacket}$ (° C.) | $T_{inside}$ (° C.) |
|---|---|---|---|
| APTsorb32 | 32 | 302 | 204 |
| APTsorb60 | 60 | 271 | 244 |
| APTsorb90 | 90 | 274 | 257 |
| APTsorb120 | 120 | 274 | 262 |
| APTsorb150 | 150 | 274 | 265 |

The physical appearance of these torrefied APTsorb intermediate samples versus the starting bioAPT material is not substantially different.

In the case of the APTsorb150 sample, heat was first provided by the thermal fluid circulating in the ribbon mixer. This heating process resulted in the decomposition of hemicellulose, which occurs naturally in partially decomposed plant matter such as peat. The decomposition of hemicellulose is itself exothermic, as evidenced by a continuing rise in atmospheric temperature even when the heat input of the thermal fluid is stopped. The concurrent decarboxylation reaction also removes carboxylic acids and ester groups within the peat granules. The heat treatment procedure results in a stable media that maintains its structural integrity even when wet and can withstand hydrolysis with acid like hydrochloric acid or hydrolysis at high pH with bases like sodium carbonate or both.

Figure 3:
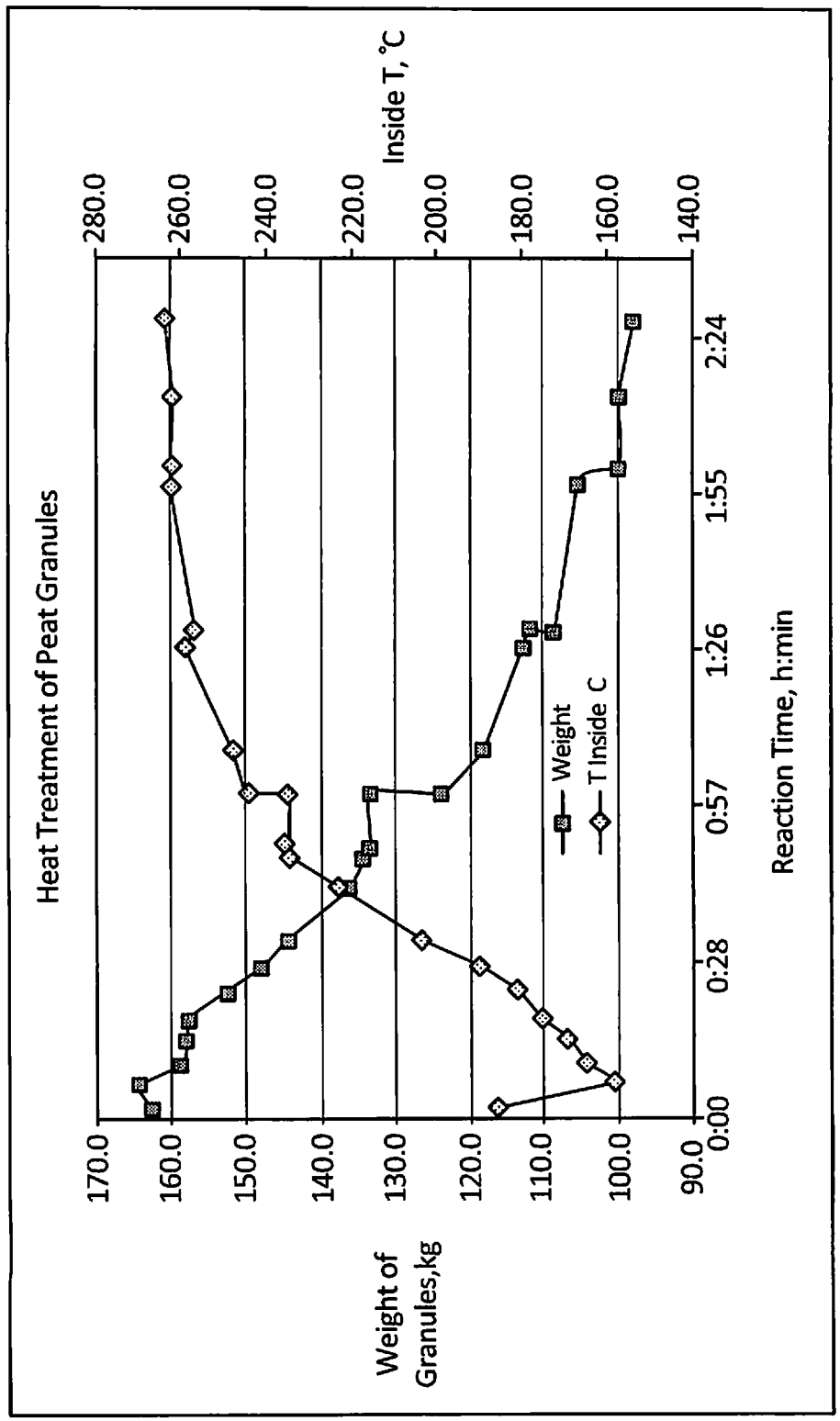
FIG. 3 represents a graphical depiction of changes in the weight of the granule and temperature over the course of the torrefaction process step.

FIG. 3 shows the resulting interior temperature increase inside the ribbon mixer and weight loss of the starting bioAPT peat granules over time. The temperature curve steadily increases until it plateaus around 260° C. after approximately 86 minutes, and does not materially increase even at 144 minutes. At the same time, if 160 kg of the bioAPT granules were used as the starting material, the weight loss over time steadily decreases until only 100 kg of material remains at 144 minutes. Thus, while the heat treatment step of this invention acts to harden the peat granules via the cross-linking polymerization process, it also creates a loss of peat material which reduces the amount of anion exchanger that may be ultimately produced.

Example 2—Hydrolysis of the Torrefied Peat Granules (a) Hydrolysis of Torrefied Granules with a $Na_2CO_3$ Solution Two hundred milliliters of 1M solution of $Na_2CO_3$ was added to 10 g of thermally-treated peat granules and refluxed for 20 hrs. The granules were filtered, washed with deionized water and dried at 105° C. for 24 hrs. This process was repeated for each of the APTsorb intermediate samples of Table 1. The loss of material is presented in Table 2. The higher loss, the less stable granules are.

(b) Hydrolysis of Torrefied Granules with a HCl Solution

A 2.5 L amount of a 1 N solution of HCl was added to 0.1 kg of the torrefied granules at room temperature. The mixture was heated up to 95° C. and kept at 95° C. for 3 hrs with periodic shaking in such a fashion so as not to destroy the granules. The pH was maintained at a value of 2 or lower. The mixture was filtered and washed six times with DI water, or until the test for the presence of chloride ions in the filtrate was negative. The test used for this purpose indicated the presence of chloride ions by adding 0.5 ml of a 1% solution of $AgNO_3$ to a 20 ml sample of rinsing water. If $Cl^-$ were present, a white precipitate in the form of AgCl formed immediately, and evidenced the need for additional rinsing. Finally, the granules were then dried at 105° C. for 24 hrs.

(c) Hydrolysis of Torrefied Granules with a $Na_2CO_3$ Solution Followed by a HCl Solution A 2.5 L amount of 1M solution of $Na_2CO_3$ was added to 500 g of torrefied peat granules and refluxed for 22 hrs. The pH of reaction mixture changed from 11.6 to 9.5 after hydrolysis was completed. The granules were filtered and washed with deionized water. A 2.5 L amount of a 1M solution of HCl in water was then added to the wet granules and refluxed for 3 hrs. The granules were filtered and washed with deionized water until there was no $Cl^-$ anion present. The presence of $Cl^-$ anion was measured by $AgNO_3$ test. The granules were then dried at 105° C. for 24 hours. From the starting weight of 500 grams of torrefied peat granules, 342 g of the hydrolyzed intermediate product was obtained.

The results of the hydrolyzation steps (a) and (c) are shown in Table 2 below.

TABLE 2

Weight loss and nitrogen level of the hydrolyzed thermally-treated peat granules.

| | Hydrolysis | | |
|---|---|---|---|
| | $Na_2CO_3$ | 1. $Na_2CO_3$; 2. HCl | |
| Sample | Loss (%) | Loss (%) | N (%) |
| APTsorb32 | 60.8 | 91.7 | 2.05 |
| APTsorb60 | 49.2 | 63.4 | 2.48 |
| APTsorb90 | 31.8 | 41.5 | 2.85 |
| APTsorb120 | 23 | 35.2 | 2.84 |
| APTsorb150 | 18.2 | 31.7 | 3.09 |

During the torrefaction process covered by Example 1, carboxylic acid and ester groups contained within the peat material were destroyed. These groups would normally react with the $Na_2CO_3$ reagent in the hydrolysis reaction to cause a loss of material within the peat granules. Thus, the APTsorb32 torrefied peat granules that contained more of the carboxylic acid and ester groups due to the shorter 32-minute torrefaction procedure duration suffered 60.8% wt loss of the peat material in the granules, and complete loss of structural integrity of the peat granules. Meanwhile, the APTsorb150 torrefied granules that contained much less of their carboxylic acid and ester groups due to the substantially longer 150-minute torrefaction procedure only suffered an 18.2% wt loss.

When the two-step chemical treatment procedure was employed to treat the torrefied granule samples, the $Na_2CO_3$ reagent hydrolyzed the peat granules to remove the humic acid and fulvic acid fractions within the peat granules, as was the case for the hydrolyzed samples discussed above. But when the samples were then treated with HCl acid to dissolve residual organic and inorganic materials contained inside the peat granules, and prepare the surface of the peat material for any subsequent amination, the HCl acid produced an additional loss of material within the peat granules. Hence, the combined weight loss for the APTsorb150 torrefied granules undergoing the two-step $Na_2CO_3$/HCl chemical pretreatment suffered a 31.7% wt loss, while the APTsorb32 torrefied granules suffered a devastating 91.7% wt combined weight loss. It should also be noted that the APTsorb32 granules were completely destroyed during the hydrolysis process step, whether $Na_2CO_3$ or $Na_2CO_3$ in combination with HCl were employed.

Peat naturally exhibits a nitrogen content of about 2.4% wt. The torrefied APTsorb32, APTsorb60, APTsorb90, APTsorb120, and APTsorb150 granules contained a nitrogen content of about 2.7-3.0% wt. Meanwhile, the APTsorb150 granules undergoing the two-step $Na_2CO_3$/HCl chemical pre-treatment procedure exhibited a 3.09% wt nitrogen content, demonstrating that the combined hydrolysis and acid treatment steps did not remove much of the natural nitrogen content of the peat material. While the hydrolysis step inevitably removed some nitrogen, the removal of the humic acid, fabric acid, and organic and inorganic materials from the peat increased the nitrogen content of the APTsorb150 granules treated with both the $Na_2CO_3$ and HCl reagents. Meanwhile, the APTsorb32 torrefied granules undergoing the two-step $Na_2CO_3$/HCl chemical pretreatment steps showed a 2.05% wt nitrogen content, meaning that nitrogen was lost in addition to the unacceptable 91.7% wt loss of material with the peat granules.

The greater torrefaction time of the APTsorb150 granules prepares the intermediate media to exhibit limited weight loss during high-pH hydrolysis. That, combined with the acceptable physical integrity and percent of nitrogen, makes the APTsorb150 intermediate media suitable for further reaction.

Example 3—Amination of Torrefied, Hydrolyzed Peat Granules (a) Reaction of Torrefied, Hydrolyzed Peat Granules with Aldehyde+Amine Forty milliliters of water was added into 43.3 ml (38.8 g) of a 40% solution of methylamine ($CH_3NH_2$). A solution of 30 ml water and 28.2 ml (22 g) of acetic aldehyde ($CH_3CHO$) was then added drop wise to the resulting water solution of $CH_3NH_2$ at room temperature, and then DI water was added up to 200 ml. Twenty grams of torrefied and hydrolyzed intermediate APTsorb peat granules obtained from the procedure described in Example 2(c) were wetted with water for 12 hours at room temperature. The water was filtered, and a 40 ml solution of $CH_3NH_2$ (100 mmol)/$CH_3CHO$ (100 mmol) was added. The reaction mixture was kept at 120° C. in an autoclave reactor for 17 hours. The granules were filtered, washed with water until there was no color leaching, and dried at 105° C. for 24 hours. The resulting granules were analyzed for total nitrogen. The results are shown in Table 3. The same procedures were used to create multiple products where the total nitrogen and total anion exchange capacity were measured. Those results are shown in Table 4.

TABLE 3

Nitrogen content of the torrefied, hydrolyzed, and chemically-reacted peat granules.

| Sample | Before reaction N (%) | Reacted with $CH_3CHO$/$CH_3NH_2$ N (%) |
|---|---|---|
| APTsorb32 | 2.05 | 3.67 |
| APTsorb60 | 2.48 | 3.99 |
| APTsorb90 | 2.85 | 4.85 |

TABLE 3-continued

Nitrogen content of the torrefied, hydrolyzed, and chemically-reacted peat granules.

| Sample | Before reaction N (%) | Reacted with $CH_3CHO$/$CH_3NH_2$ N (%) |
|---|---|---|
| APTsorb120 | 2.84 | 4.98 |
| APTsorb150 | 3.09 | 5.28 |

As can be seen, the weak anion exchanger resulting from chemical treatment of the APTsorb150 intermediate material with the separate acetic aldehyde and methyl amine reagents exhibited a 5.28% wt nitrogen content. This result suggests that successful attachment of amine groups to the peat granules that are necessary for a weak anion exchange medium has occurred. This is significantly higher than the 3.09% wt nitrogen content of the unreacted APTsorb150 sample. This result is also far better than the weak anion exchanger resulting from the APTsorb32 intermediate material that exhibited a 3.67% wt nitrogen content. While that 3.67% wt nitrogen content for the reacted APTsorb32 sample may have represented a favorable improvement over the 2.05% wt nitrogen content of the unreacted APTsorb32 sample, the net increase in nitrogen content was far below the 5.28% wt for the reacted APTsorb150 sample.

(b) Reaction of Torrefied, Hydrolyzed Peat Granules with Adduct Reagent

In a separate experiment, twenty grams of torrefied and hydrolyzed APTsorb150 peat granules were wetted with water for 12 hrs. The water was filtered and a solution of the hexamethylenetetramine (5 g, 35.7 mmol) adduct reagent, instead of the separate aldehyde and amine reagents, in 20 ml water was added. The reaction mixture was kept at 120° C. in an autoclave reactor for 17 hours. The granules were filtered, washed with water until there is no color leaching, and dried at 105° C. for 24 hours. The granules were analyzed for total nitrogen and total anion exchange capacity. The results are shown in Table 4 in lines 15 to 17.

Example 4—Anion Exchange Mediums (APTsorb $NH_2$)

Prepared in Accordance with the Invention

A variety of different anion exchange media were prepared using the torrefaction treatment durations (32 vs. 150 minutes), hydrolyzation chemical pretreatment agents (HCl vs. $Na_2CO_3$/HCl), and main chemical reaction reagents shown in Table 4. The total nitrogen content was determined for each sample by elemental analysis. Moreover, the total anion exchange capacity represented by the number of active amine groups ($NH_2$) attached to the phenol group in the peat material of the granule samples was measured by both an equilibrium method and a column method.

Equilibrium Method:

Fifty milliliters of 10,000 ppm (102 mM) solution of $H_2SO_4$ in Type I DI was added to 0.5 g of modified peat granules and rotated by rotator for 1 hr at room temperature at 30 rpm. Peat granules were centrifuged at 4,000 rpm for 15 minutes and the solution was decanted. The remaining solution was transferred from the tube by pipet. Fifty milliliters of 0.5 N solution of sodium hydroxide in water was added to peat granules and was rotated by rotator for 3 hrs at 30 rpm. The solution was filtered, the granules were washed with DI water 3 times (3×5 ml), and all washings were combined. The total volume was adjusted to 100 ml by adding a Type I DI water to combined washings. One milliliter of the resulting water solution was diluted to 100 ml by type I DI water, filtered through 0.45 µm syringe filter (PTFE membrane), and the concentration of $SO_4^{2-}$ was measured by ion chromatography technique.

The total number of $NH_2$ group was calculated by following formula:

$$NH_2\left(\frac{mEq}{100\ g}\right) = \frac{C\ SO_4^{2-}\ ppm \times 1000}{48}$$

Column Method:

The total anion exchange capacity of APTsorbNH2 weak anion exchange media sourced from the combined material produced by the hexamethylenetetramine-reacted peat granules in lines 16&17 of Table 4 was determined by bench-scale columns using 0.1N solution of $H_2SO_4$ in water at flow rate 5 ml/min (0.1 m/hr, 3.28 BV/hr). The APTsorbNH2 media was pre-wetted in Type I deionized water for a minimum of 3 hours. The column was loaded from the top, first with a plastic screen to retain the media inside the column, then with a layer of HCl-washed Red Flint filter gravel (granular size 3-5 mm), and then with the pre-wetted APTsorbNH2 media. A second plastic screen was placed on top of the APTsorbNH2 media, and finally a second layer of filter gravel was spread on the top of the screen. The influent flow was controlled by a peristaltic pump and all flows were bottom feed to produce an upward flow. A minimum of 10 bed volumes of Type I deionized water were pumped through the column prior to the testing solution.

Run 1: A solution of 0.1N of $H_2SO_4$ in water was introduced into the column. The solutions were at room temperature. Each empty bed volume of effluent samples was collected and titrated using a 0.1N solution of sodium hydroxide in water and phenolphthalein as an indicator. A sample of the peat media was taken and analyzed for total percentage of nitrogen. Influent was changed to a 0.1N solution of NaOH and the column was regenerated until no $SO_4^{2-}$ ions were found in the effluent ($Ba(NO_3)_2$ test). All NaOH washings were combined and analyzed for a concentration of $SO_4^{2-}$ using ionic chromatography technique.

Run 2: The media from Run 1 was washed with DI water until stable pH was observed. A solution of 0.1N of $H_2SO_4$ in water was introduced into the column. The solutions were at room temperature. Each empty bed volume of effluent samples was collected and titrated using a 0.1N solution of sodium hydroxide in water and phenolphthalein as an indicator. A sample of the peat media was taken and analyzed for total percentage of nitrogen. Influent was changed to a 0.1N solution of NaOH and the column was regenerated until no $SO_4^{2-}$ ions were found in the effluent. All NaOH washings were combined, diluted to 1 L and analyzed for a concentration of $SO_4^{2-}$ using ionic chromatography technique.

TABLE 4

Total nitrogen and total anion exchange capacity of various APTsorbNH2 granular peat products

| Lines | Torrefied Peat granules | Pre-treatment | Chemical Reagents | N (%) | Anion exchange capacity (N, mEq/100 g) Equilibrium method | Column method |
|---|---|---|---|---|---|---|
| 1 | APTsorb32 | HCl | | 2.78 | | |
| 2 | APTsorb32 | HCl | $HCHO/CH_3NH_2$ | 3.46 | | |
| 3 | APTsorb32 | HCl | $HCHO/n\text{-}PrNH_2$ | 3.12 | | |
| 4 | APTsorb32 | HCl | $HCHO/HOCH_2CH_2NH_2$ | | | |
| 5 | APTsorb32 | HCl | $CH_3CHO/CH_3NH_2$ | 3.51 | | |
| 6 | APTsorb32 | HCl | $CH_3CHO/n\text{-}PrNH_2$ | 3.08 | | |
| 7 | APTsorb32 | HCl | $CH_3CHO/i\text{-}PrNH_2$ | 3.03 | | |
| 8 | APTsorb32 | HCl | $HCHO/HOCH_2CH_2NH_2$ | 3.79 | | |
| 9 | APTsorb32 | HCl | $CH_3CH_2CHO/CH_3NH_2$ | 3.27 | | |
| 10 | APTsorb32 | HCl | $CH_3CH_2CHO/n\text{-}PrNH_2$ | 3.10 | | |
| 11 | APTsorb32 | HCl | $CH_3CH_2CHO/HOCH_2CH_2NH_2$ | 3.50 | | |
| 12 | APTsorb32 | HCl | $NH_4OH/CH_3CHO$ | 4.42 | | |
| 13 | APTsorb32 | HCl | $NH_4OH/CH_3CH_2CHO$ | 3.99 | | |
| 14 | APTsorb32 | HCl | hexamethylenetetraamine | 6.37 | | |
| 15 | APTsorb150 | 1. $Na_2CO_3$ 2. HCl | | 3.09 | 10.0 | |
| 16 | APTsorb150 | 1. $Na_2CO_3$ 2. HCl | hexamethylenetetraamine | 7.12 | 58.3 | 84 |
| 17 | APTsorb150 | 1. $Na_2CO_3$ 2. HCl | hexamethylenetetraamine | 7.16 | 57.6 | 84 |
| 18 | APTsorb150 | 1. $Na_2CO_3$ 2. HCl | $CH_3CHO/CH_3NH_2$ | 5.18 | 55.7 | |
| 19 | APTsorb150 | 1. $Na_2CO_3$ 2. HCl | $CH_3CHO/CH_3NH_2$ | 5.31 | 58.4 | |
| 20 | APTsorb150 | 1. $Na_2CO_3$ 2. HCl | $CH_3CHO/CH_3NH_2$ | 5.44 | 63.0 | |
| 21 | Reed-Sedge peat | | | 2.57 | | |
| 22 | Reed-Sedge peat | | hexamethylenetetraamine | 6.29 | 73.4 | |
| 23 | Reed-Sedge peat | 1. $Na_2CO_3$ 2. HCl | hexamethylenetetraamine | 2.88 | 54.1 | |
| 24 | Reed-Sedge peat | HCl | $CH_3CHO/CH_3NH_2$ | 4.22 | 57.7 | |

The total anion exchange capacity was calculated using following formula:

$$NH_2\left(\frac{mEq}{100\ g}\right) = \frac{C\ SO_4^{2-}\ ppm \times 100\ (g)}{96 \times 50\ (g)}$$

Measurement of the Concentration of $SO_4^{2-}$ Anion Using Ion Chromatograph

IC analysis was performed using a Metrohm 881 Compact IC pro which was equipped with a pump, injector, eluent degasser, MSM, MCS, IC conductivity detector, column and 858 Professional Sample Processor, sample Rack #6.2041.440. The following analytical conditions were used to measure the concentration of sulfate anion:
Column: Metrosep A Supp 5—150/4.0, 6.1006.520, Serial #7108544, Metrohm Ion Analysis
Guard column: Metrosep RP2 Guard/3.6, 6.1011.030 Serial #0099.0218, Metrohm
Mobile phase: 3.2 mM $Na_2CO_3$/1.0 mM $NaHCO_3$ in type I DI water
Flow rate: 0.7 mL/min
Column pressure: 7.89-8.12 MPa
Column temperature: 35° C.
Injection volume: 20 µL
Discussion of Results The process parameters used for the Run 1 and Run 2 column tests and the resulting column data for the adsorption of $H_2SO_4$ onto the $APTsorbNH_2$ weak anion exchanger end products produced from the torrefied APTsorb150 that is subjected to the the two-step $Na_2CO_3$/HCl pretreatment process coupled with the hexamethyletetramine chemical reagent (i.e., the combined media from lines 16-17 in Table 4) are shown more clearly in Table 5. Also shown are the nitrogen content and total anion exchange capacity for the APTsorbNH2 media used in those tests. The data results for Run 1 and Run 2 are also depicted in FIG. 4.

Figure 4:
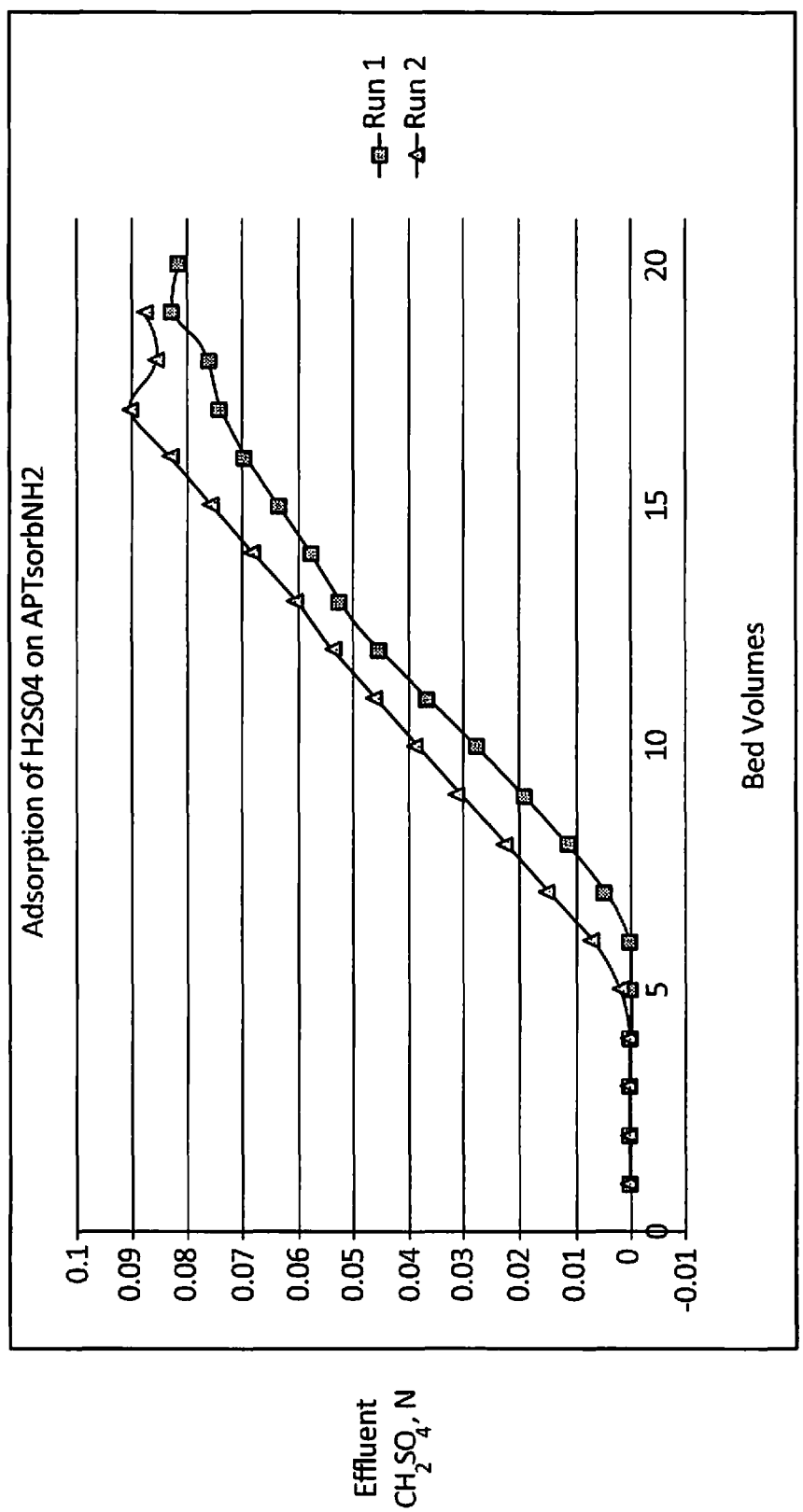
FIG. 4 represents a graphical depiction of the column experiment described in Example 4.

As can be seen from the Run 1 results depicted in FIG. 4, the APTsorbNH2 granules for bed volumes 1-6 resulting from the column method removed virtually all of the $H_2SO_4$ acid that was introduced into the column. Virtually clean water exited the column. Starting with bed volume 7, breakthrough was reached in which the anion exchange sites on the peat APTsorbNH2 granules started to fill up with the sulfate anions, meaning that a portion of the acid introduced into the column remained in the aqueous solution exiting the column. At about bed volume 19, the concentration of the effluent plateaued at around 0.082 mEq/100 g, showing that all of the anion exchange sites on the peat granules had filled up with the sulfate anions.

The Run 2 results are depicted in FIG. 4. The breakthrough for the APTsorbNH2 granules was reached at around bed volume 5, and the performance of the weak anion exchange media plateaued around bed volume 17 at an effluent concentration of 0.09 mEq/100 g. The curves for the Run 1 and Run 2 samples are very similar, demonstrating that the performance by the APTsorbNH2 granule media was repeatable after the media was regenerated using 0.1 N NaOH solution.

Therefore, the results of this Example 4 show that the APTsorbNH2 granule product is taking up sulfate anions from the $H_2SO_4$ acid solution introduced into the column. The media stopped sorbing all of the sulfate anions after around 5-6 bed volumes. The media became nearly saturated with sulfate anions around 17 bed volumes. The media was successfully regenerated by NaOH reagent as demonstrated by the similar curves in FIG. 4 for Run 1 and Run 2. By definition, a weak anion exchanger takes up anions in an acidic environment and can be regenerated, which is demonstrated by this Example 4. Example 3 already showed that amine groups were successfully attached to the peat material.

We want a high value for the number of amine groups (anion exchange capacity). This serves as a proxy for measuring the ability of the weak anion exchange medium to adsorb sulfates contained in the wastewater. As can be seen from Table 4, the APTsorb150-based weak anion exchanger products using a two-step $Na_2CO_3$/HCl pretreatment process coupled with the hexamethylenetetramine adduct reagent for the main chemical reaction (lines 16-17 samples) produced end products exhibiting 7.12% wt and 7.16% wt nitrogen, respectively, in combination with 58.3 and 57.6 mEq/100 g anion exchange capacity, respectively, measured by the equilibrium method. The combination of both samples resulted in an anion exchange capacity measurement of 84 mEq/100 g employing the column method.

By comparison, the APTsorb150-based products using a two-step $Na_2CO_3$/HCl pretreatment process coupled with the separate $CH_3CHO$ and $CH_3NH_2$ reagents for the main chemical reaction exhibited an anion exchange capacity of 55.7-63.0 mmol/100 g (lines 18-20 samples), which is similar to or even exceeds the anion exchange capacities of the weak anion exchanger products produced using the hexamethylenetetramine adduct reagent. But, these products produced by means of the separate $CH_3CHO$ and $CH_3NH_2$ reagents only showed nitrogen contents of 5.18-5.44% wt, which is significantly inferior to the products produced using the hexamethylenetetramine adduct reagent.

Reed-Sedge peat does not naturally have any anion exchange capacity. Reed-Sedge peat by itself also exhibits a nitrogen content of only 2.57% wt (line 21 sample). If such untorrefied Reed-Sedge peat is subjected to the two-step $Na_2CO_3$/HCl pretreatment process coupled with the hexamethylenetetramine adduct reagent, such resulting weak anion exchanger product (line 23 sample) exhibited a respectable

TABLE 5

Run 1 and Run 2 Column Test Parameters and Results

| Runs | $C_{influent}$, $H_2SO_4$ | Flow rate, ml/min | $m_{granules}$, g | Column diameter, mm | Bed depth, mm | Empty Bed Volume, ml | Flow rate, BV/hr | Flow velocity, m/hr | N of peat, % | Total anion exchange capacity mEq/100 g |
|---|---|---|---|---|---|---|---|---|---|---|
| 1 | 0.1 | 5 | 50 | 62 | 31 | 92.3 | 3.28 | 0.10 | 6.47% | 84 |
|   |     |   |    | Regeneration with a solution of 0.1N NaOH in water | | | | | | |
| 9 | 0.1 | 5 | 50 | 62 | 31 | 92.3 | 3.28 | 0.10 | 6.37% | 56 |
|   |     |   |    | Regeneration with a solution of 0.1N NaOH in water | | | | | | | anion exchange capacity of 54.1 mmol/100 g, but only a 2.88% wt nitrogen content, which is very low.

Thus, these experimental results of Table 4 support the conclusion that the preferred peat-based weak anion exchanger product is prepared in accordance with the present invention using the two-step hydrolysis and acid pre-treatment process (e.g., $Na_2CO_3$ and HCl) along with an adduct reagent of an aldehyde and an amine (e.g., hexamethylenetetramine).

Note that the APTsorb32 granules reacted with a mixture of aldehyde and amine reagents produced weak anion exchange media exhibiting such low nitrogen content on the order of 3-4.5% wt that their total anion exchange capacity values were not measured (lines 2-11 samples). These granules also were not stable enough to be usable under high-pH environments produced by the sodium hydroxide instead of HCl acid.

The above specification, drawings, examples, and data provide a complete description of the thermally-activated, chemically-treated sorption media and associated preparation method of the present invention. Since many embodiments of the invention can be made without departing from the spirit and scope of the invention, the invention resides in the claims hereinafter appended.

We claim:

1. A process for the production from phenol-containing organic matter of a weak anion exchanger media for use in the treatment of aqueous solutions comprising anions that are part of at least one type of mineral acid or organic acid contained therein, comprising the steps of:
    (a) supplying an amount of the phenol-containing, moisture-bearing organic matter to a granulating machine;
    (b) granulating the phenol-containing organic matter;
    (c) drying the granules;
    (d) torrefying the granules without thermal activation or chemical activation using a heat medium at a temperature of about 175-300° C.;
    (e) chemically pre-treating the torrefied granule with a reagent to hydrolyze it to remove humic acid or fulvic acid fractions from the phenol-containing organic material of the granule:
    (f) chemically treating the hydrolyzed, torrefied granule with either a separate aldehyde reagent and an amine reagent, or an adduct reagent for an aldehyde and an amine to attach at least one amine group to the phenol-containing organic material of the granule;
    (g) wherein the weak anion exchanger media granule exhibits physical stability at a higher-pH environment and attracts anions of the mineral acid or organic acid contained within the aqueous solution.

2. The process of claim 1, wherein the temperature of the torrefaction step is about 200-275° C.

3. The process of claim 1, wherein the torrefaction step is conducted on the peat granule for a time period of about 25-200 minutes.

4. The process of claim 3, wherein the torrefaction step time period is about 150 minutes.

5. The process of claim 1, wherein the hydrolyzation reagent is selected from the group consisting of $Na_2CO_3$, NaOH, KOH, $NaHCO_3$, $K_2CO_3$, and $KHCO_3$.

6. The process of claim 1 further comprising the step of washing the hydrolyzed granules with water to remove residual ions from the hydrolyzing reagent.

7. The process of claim 1, wherein the separate aldehyde reagent for the (f) chemical reaction is selected from the group consisting of formaldehyde (HCHO), acetic aldehyde ($CH_3CHO$), propionic aldehyde ($C_2H_5CHO$), butyric aldehyde ($C_3H_7CHO$), and benzaldehyde.

8. The process of claim 1, wherein the separate amine reagent for the (f) chemical reaction is selected from the group consisting of ammonia ($NH_3$), methyl amine ($CH_3NH_2$), ethyl amine ($C_2H_5NH_2$), propyl amine ($C_3H_7NH_2$), iso-propyl amine ($C_3H_7NH_2$), and butyl amine ($C_4H_{11}NH_2$).

9. The process of claim 1, wherein the adduct reagent for the (f) chemical reaction is selected from the group consisting of hexamethylenetetramine; 1,3,5-trimethylhexahydro-1,3,5-triazine; 1,3,5-tripropyl-1,3,5-triazinane; 1,3,5-triethyl-1, 3,5-triazinane; and hexahydro-2,4,6-trimethyl-1,3, 5-triazine.

10. The process of claim 1 further comprising a step of, after the hydrolyzation step, treating the hydrolyzed granules with an acid reagent to dissolve residual minerals and organic materials contained within the phenol-containing organic material within the granule, and prepare the surface of the granule for the amine reagent during the subsequent chemical treatment step.

11. The process of claim 10, wherein the acid reagent is selected from the group consisting of $H_2SO_4$, $HNO_3$, $CH_3COOH$, HCOOH, and HCl.

12. The process of claim 10, wherein the resulting weak anion exchanger media exhibits a nitrogen content of at least about 3% wt, or a nitrogen content that is at least about 0.5 wt higher than the nitrogen content of the phenol-containing organic material used to prepare the weak anion exchanger media.

13. The process of claim 10, wherein the resulting weak anion exchanger media exhibits an anion exchange capacity of about 58-80 mEq/100 g.

14. The process of claim 1, wherein the aqueous solution comprises a water-based solution containing an environmental impurity as a solute produced by manufacturing, agricultural, or mining industries or population communities, comprising wastewater discharges; industrial streams; storm water runoffs; mine dewatering streams from mining pits; animal slaughterhouse, cattle-yard, and other agricultural runoffs; spent processing waters emanating from mining, grinding, milling, metallurgical, or extraction process; and hydrofracking.

15. The process of claim 1, wherein the mineral acids precursor of the anions contained within the aqueous solution is selected from the group consisting of $H_2SO_4$, $HNO_3$, HCl, HBr, HF, $H_3PO_4$, and HI.

16. The process of claim 1, wherein the organic acids precursor of the anions contained within the aqueous solution is selected from the group consisting of HCOOH, $CH_3COOH$, and $C_2H_5COOH$.

17. The process of claim 1, wherein the phenol-containing organic matter comprises a naturally-occurring, carbon-based, organic material containing phenolic moieties in its structure that has partially decayed or decomposed over time in the ground, or is a plant or animal-based product that is subjected to a bacterial or thermal decomposition process to partially decompose the organic materials therein, comprising peat, compost media, lignite coal, partially-decomposed wood, lignin and lignin derivatives, phenols, aromatic hydrocarbons with phenolic moieties, and combinations thereof.

18. The process of claim 17, wherein the compost media is selected from the group consisting of leaf compost media, peat, plant by-products, and combinations thereof.

19. The process of claim 1, wherein the granule temperature during the drying step is conducted at a temperature of about 80-400° C.

20. The process of claim 1, wherein the weak anion exchanger media produced by the process exhibits a high anion exchange capacity for attracting anions of the mineral acid or organic acid contained with the aqueous solution of: (a) at least 54 mEq/100 g; or (b) at least a 0.5% increase in nitrogen content compared with the nitrogen content of the phenol-containing organic matter starting material.

21. A process for the production from phenol-containing organic matter of a weak anion exchanger media for use in the treatment of aqueous solutions comprising anions that are part of at least one type of mineral acid or organic acid contained therein, comprising the steps of:
    (a) supplying an amount of the phenol-containing, moisture-bearing organic matter to a granulating machine;
    (b) granulating the phenol-containing organic matter;
    (c) drying the granules;
    (d) chemically treating the granule with either a separate aldehyde reagent and an amine reagent, or an adduct reagent of an aldehyde and an amine to attach at least one amine group to the phenol-containing organic material of the granule;
    (e) wherein the weak anion exchanger media granule exhibits physical stability at a higher-pH environment and attracts anions of the mineral acid or organic acid contained within the aqueous solution.

22. The process of claim 21, wherein the separate aldehyde reagent for the (d) chemical reaction is selected from the group consisting of formaldehyde (HCHO), acetic aldehyde ($CH_3CHO$), propionic aldehyde ($C_2H_5CHO$), butyric aldehyde ($C_3H_7CHO$), and benzaldehyde.

23. The process of claim 21, wherein the separate amine reagent for the (d) chemical reaction is selected from the group consisting of ammonia ($NH_3$), methyl amine ($CH_3NH_2$), ethyl amine ($C_2H_5NH_2$), propyl amine ($C_3H_7NH_2$), iso-propyl amine ($C_3H_7NH_2$), and butyl amine ($C_4H_{11}NH_2$).

24. The process of claim 21, wherein the adduct reagent for the (d) chemical reaction is selected from the group consisting of hexamethylenetetramine; 1,3,5-trimethylhexahydro-1,3,5-triazine; 1,3,5-tripropyl-1,3,5-triazinane; 1,3,5-triethyl-1, 3,5-triazinane; and hexahydro-2,4,6-trimethyl-1,3,5-triazine.

25. The process of claim 21, wherein the weak anion exchanger media produced by the process exhibits a high anion exchange capacity for attracting anions of the mineral acid or organic acid contained with the aqueous solution of: (a) at least 54 mEq/100 g; or (b) at least a 0.5% increase in nitrogen content compared with the nitrogen content of the phenol-containing organic matter starting material.

* * * * *